(12) United States Patent
Ruizenaar

(10) Patent No.: US 9,441,966 B2
(45) Date of Patent: Sep. 13, 2016

(54) MEASUREMENT DEVICE AND METHOD FOR MEASURING

(75) Inventor: Marcel Gregorius Anthonius Ruizenaar, Delft (NL)

(73) Assignee: Nederlandse Organisatie Voor Toegepast-Natuurwetenschappelijk Onderzoek TNO, Delft (NL)

( * ) Notice: Subject to any disclaimer, the term of this patent is extended or adjusted under 35 U.S.C. 154(b) by 491 days.

(21) Appl. No.: 14/000,758

(22) PCT Filed: Feb. 23, 2012

(86) PCT No.: PCT/NL2012/050108
§ 371 (c)(1),
(2), (4) Date: Sep. 6, 2013

(87) PCT Pub. No.: WO2012/115515
PCT Pub. Date: Aug. 30, 2012

(65) Prior Publication Data
US 2014/0005975 A1    Jan. 2, 2014

(30) Foreign Application Priority Data
Feb. 23, 2011 (EP) .................... 11155702

(51) Int. Cl.
*G01C 15/00* (2006.01)
*G01C 19/00* (2013.01)
*G01C 17/38* (2006.01)
*G01C 19/56* (2012.01)
(Continued)

(52) U.S. Cl.
CPC ............. *G01C 15/00* (2013.01); *G01C 17/38* (2013.01); *G01C 19/00* (2013.01); *G01C 19/56* (2013.01); *G01C 19/5776* (2013.01);
*G01C 25/00* (2013.01); *G01C 25/005* (2013.01); *G01P 15/08* (2013.01); *G01P 15/18* (2013.01); *G01P 21/00* (2013.01)

(58) Field of Classification Search
CPC ...... G01C 15/00; G01C 19/00; G01C 19/56; G01C 19/5776; G01C 21/00; G01C 21/18; G01C 21/20; G01C 25/00; G01C 25/005
See application file for complete search history.

(56) References Cited

U.S. PATENT DOCUMENTS

2007/0220971 A1   9/2007 Ayazi et al.
2009/0326851 A1* 12/2009 Tanenhaus ............. G01C 21/16
                                                             702/96

OTHER PUBLICATIONS

Oliver J. Woodman, An Introduction to Inertial Navigation, Aug. 2007, Technical Report, No. 696, University of Cambridge, Computer Laboratory, pp. 1-37.*

(Continued)

*Primary Examiner* — Toan Le
(74) *Attorney, Agent, or Firm* — Husch Blackwell LLP

(57) ABSTRACT

A measuring device includes a pair of sensors, an actuator, a noise extraction unit and a low frequency noise (LFN) estimator. The sensors each generate with sample time Ts a sense signal indicating a value of a component of a vectorial physical quantity. The sensors have an Allan variance curve with a minimum value for a first integration time T1. The curve has a first and second tangent line being tangent at integration time 0, and integration time T1 respectively. The tangent lines intersect each other at an intersection point for a second integration time T2. The estimator having an effective integration time Teff determined by, Ts, T1 and T2, generates an estimated noise signal indicative for the estimated value of the noise component from the difference signal and from information about the relative rotation between the sensors.

12 Claims, 18 Drawing Sheets

(51) Int. Cl.
| | |
|---|---|
| *G01C 25/00* | (2006.01) |
| *G01P 15/08* | (2006.01) |
| *G01P 15/18* | (2013.01) |
| *G01P 21/00* | (2006.01) |
| *G01C 19/5776* | (2012.01) |

(56) References Cited

OTHER PUBLICATIONS

El-Sheimy et al., Analysis and Modeling of Inertial Sensors Using Allan Variance, Jan. 2008, IEEE Transactions on Instrumentation and Measurement, vol. 57, No. 1, pp. 140-149.*

Stancic et al., The Integration of Strap-Down INS and GPS Based on Adaptive Error Damping, 2010, Robotics and Autonomous Systems 58, pp. 1117-1129.*

Haiying Hou, Modeling Inertial Sensors Errors Using Allan Variance, UCGE Reports No. 20201, University of Calgary, Department of Geomatics Engineering, Sep. 2004, pp. iii-128.

Trusov et al., Sensors and Actuators A 155 (2009) 16-22.

Alper et al., Jourmal of Microelectromechanical Systems, vol. 17, No. 6, Dec. 2008, 1418-1429.

Zaman et al., MEMS 2006, Istanbul, Turkey, Jan. 22-26, 2006, 66-69.

IEEE, IEEE Recommended Practice for Inertial Sensor Test Equipment, Instrumentation, Data Acquisition, and Analysis, IEEE Std 1554-2005, Nov. 28, 2005, iv-103.

EEE, IEEE Standard Specification Format Guide and Test Procedure for Single-Axis Laser Gyros, IEEE Std 647-2006, Sep. 18, 2006, iv-83.

* cited by examiner

MEASUREMENT DEVICE AND METHOD FOR MEASURING

BACKGROUND OF THE INVENTION

1. Field of the Invention

The present invention relates to a device for measuring a vectorial physical quantity.

The present invention further relates to a method for measuring a vectorial physical quantity.

2. Related Art

Nowadays GPS navigation facilities are available that can relatively accurately determine a position of a vehicle. However, in some circumstances alternative navigation methods are required as GPS-navigation signals are not always available, for example at locations below sea level and in buildings. One such alternative method is based on data obtained from inertial sensors. Inertial sensors comprise gyroscopes and accelerometers. Gyroscopes provide information about the angular rate of the vehicle from which the orientation of the vehicle can be derived and accelerometers provide information about its acceleration. Such sensors are typically available in a set, wherein they are mutually orthogonally arranged. For example a 2D or a 3D-gyroscope-set comprises respectively two and three mutually orthogonally arranged gyroscopes. If the initial position, velocity and orientation of a vehicle are known, its momentaneous velocity and position can be estimated by numerical integration of the acceleration and orientation data obtained from the accelerometers and gyroscopes. Generally accelerometers and gyroscopes have a systematic error, also denoted as bias, resulting in a drift in position indication, exponential in time. Accordingly, such navigation systems based on inertial sensors need to be calibrated periodically to measure and compensate the sensor biases. With low-cost sensors, and without bias compensation, the navigation solution becomes useless within minutes.

The Allan Variance (AVAR) is a well-known method for analyzing a time sequence to determine the intrinsic noise in a system as a function of the averaging time. Stockwell, "Bias Stability Measurement: Allan Variance" www.xbow.com/pdf/Bias_Stability_Measurement.pdf, applies this method to inertial sensors and points out that the Allan Variance is mainly determined by two factors. At short averaging times, the Allan Variance is dominated by the white (gaussian) noise in the sensor. There is a direct correlation between the standard deviation of the white noise contribution of the output vs. time with the slope of the Allan Variance at small t. For gyroscopes this is also referred to as angle random walk (ARW). However for relatively long integration times, the Allan Variance starts to increase again. This is due to so called $1/f^\alpha$ low frequent correlated noise in the sensor, inherent instability in the output of the sensor and also referred as rate random walk (RRW) in the case of gyroscopes. As a result of these two contributions the Allan variance has a minimum. It is noted in the cited article that the minimum variance is the best stability that can be achieved with a fully modeled sensor and active bias estimation. In the sequel the integration time for which the minimum of the Allan variance is obtained will be denoted herein also as the Allan minimum time.

It is noted that test procedures for inertial sensors are described in "IEEE Recommended Practice for Inertial Sensor Test Equipment. Instrumentation, Data Acquisition, and Analysis"; IEEE Std 1554-2005 ED.

There is a need to improve an accuracy with which a vectorial physical quantity such as an acceleration, a rotation or a magnetic field strength can be measured.

SUMMARY OF THE INVENTION

According to a first aspect of the invention a measuring device is provided as claimed in claim 1.

In the measuring device according to the first aspect of the invention at least a first and a second sensor each measure the vectorial physical quantity, and the sensors each generate a sense signal in response to the measured physical quantity.

A first and a second sensor are sufficient if the direction of the vectorial physical quantity is known and it is only necessary to determine its magnitude. The sense signals each include a first signal part indicative for the measured quantity and a second, noise part. The measuring device may comprise more sensors in addition to the at least a first and a second sensor. For example three sensors are sufficient if the vectorial physical quantity is a two-dimensional quantity. Therewith also the direction of the vectorial quantity can be determined. Likewise four sensors are sufficient in case the vectorial physical quantity to be measured is a three-dimensional quantity.

Most sensors have an Allan variance curve with a minimum for a particular integration time Tmin. As indicated above, this is explained by the two contributions of white noise and $1/f^\alpha$ noise. The Allan variance curve has a first tangent line to a portion of the curve for which the integration time approaches 0, and has a second, horizontal, tangent line of constant standard deviation that corresponds to said Allan minimum value. The first and second tangent lines having an intersection point for a second particular integration time.

In the measuring device according to the first aspect at least one actuator is provided for causing a relative rotation between the first and the second sensor. To cause the relative rotation it is sufficient that only one of the sensors is rotated and that the other sensor is maintained fixed with respect to a reference frame of the measuring device. In case the vectorial quantity to be measured is a two-dimensional quantity it suffices to have a single actuator, which may have the form of a motor that rotates one of the sensors according to an axis fixed with reference to the reference frame. It is not necessary that the rotation is carried out with a uniform rotational velocity. Alternatively the actuator may rotate a sensor between a number of predetermined orientations wherein the sensor is temporarily maintained.

The measuring device according to the first aspect has a noise extraction unit for receiving the sense signals and for providing a difference signal indicative for a weighted difference between the sense signals. The weighted difference is substantially independent of the vectorial physical quantity.

Preferably the signal parts dependent on the sensed vectorial physical quantity of the mutually weighted sense signals substantially cancel out each other, e.g. their magnitude is reduced by a factor of at least 10, preferably by a factor of at least 100, and more preferably by a factor of at least 1000.

The noise extraction unit comprises a signal weighting unit for weighting the sense signals dependent on the relative rotation, and for providing mutually weighted sense signals. In particular the signal weighting unit has at least one multiplication unit for multiplying one of the sense signals with a weighting factor.

The noise extraction unit further comprises a signal compensation unit, for receiving the mutually weighted sense signals from the signal weighting unit, and for providing a difference signal indicative for a difference between the mutually weighted sense signals.

Typically one of the sensors is maintained in a fixed position with respect to a reference frame of the measuring device and the other sensor is rotated. The rotation of said other sensor has the effect that it changes the sensed value of the vectorial physical quantity. The weighting unit has a multiplication unit that typically simulates this effect in the signal obtained from the fixed sensor. Strictly speaking this is not necessary. In an embodiment for example the weighting unit may have a multiplication unit for each of the sense signals that additionally multiplies each of the sense signals with a constant. Or if the sense signals are vectorial quantities, the weighting unit may additionally mathematically rotate each of these sensed signals by the same amount. If the sensors have a mutually different sensitivity the weighting unit may compensate for this difference in sensitivity. It is merely important that the first signal parts in the set of mutually weighted sensed signals cancel each other in the signal compensation unit.

The measuring device according to the first aspect has a low frequency noise estimator for estimating for at least one of the sense signals a correlated low frequency noise component from the difference signal and from information about the relative rotation between the sensors. The low frequency noise estimator generates an estimated noise signal indicative for the value of said correlated low frequency noise component. The low frequency noise estimator has an effective integration time, which is at least two times a sample frequency with which the sense signals are obtained. The effective integration time is less than the particular integration time, also denoted as the Allan minimum time. In particular the effective integration time is selected substantially smaller than the Allan minimum time, namely the effective integration time is at most two times the above-mentioned second integration time.

In this way a low-frequency noise component in the sensor signals can be accurately estimated. A subtraction unit receives the estimated noise signal and the output signal of one of the sensors and provides an output signal indicative for a sensed value of the vectorial physical quantity compensated for the noise estimated by said low frequency noise estimator.

Surprisingly it has been found that although the integration time is selected substantially smaller than the Allan minimum time, an improvement is obtained in the overall performance of the measurement results. As in the measuring device according to the first aspect the contribution of correlated noise is estimated the vectorial physical quantity is measured with an improved accuracy.

According to a second aspect of the invention a measuring method for measuring a vectorial physical quantity (x). The measuring method comprises the steps of measuring a component of the vectorial physical quantity with at least a first and a second sensor therewith generating a respective sense signal respectively, said sense signals each including a first part indicative for the component of the measured quantity and a second, noise part, said sensors having an Allan variance curve with a minimum for a particular integration time Tmin, said Allan variance curve having a first tangent line to a portion of the curve for which the integration time approaches 0, and having a second, horizontal, tangent line of constant standard deviation corresponding to said Allan minimum value, said first and said second tangent line having an intersection point for a second particular integration time, causing a relative rotation between said at least a first and a second sensor, providing a difference signal indicative for a weighted difference between the sense signals, said weighted difference being substantially independent of the vectorial physical quantity, comprising the steps of weighting the sense signals dependent on the relative rotation to provide mutually weighted sense signals, the signal weighting unit having at least one multiplication unit for multiplying one of the sense signals with a weighting factor associated with the relative rotation, providing a difference signal indicative for a difference between the mutually weighted sense signals, estimating a correlated low frequency noise component from the difference signal and from information about the relative rotation between the sensors and for generating an estimated noise signal (n) indicative for the value of said noise component, said low frequency noise estimation having an associated effective integration time that is at least two times a sample frequency with which the sense signals are obtained, which effective integration time is less than the smallest particular integration time of the sensor comprised in the measuring device and which effective integration time is at most two times said second integration time, providing an output signal indicative for a sensed value of the vectorial physical quantity corrected for the noise as estimated by said low frequency noise estimation.

BRIEF DESCRIPTION OF THE DRAWINGS

These and other aspects are described in more detail with reference to the drawing. Therein:

FIG. 32A shows measurement results obtained from one of these gyroscopes, and FIG. 32B shows measurement results obtained with the measuring device using these gyroscopes.

DETAILED DESCRIPTION OF EMBODIMENTS

Figure 1:
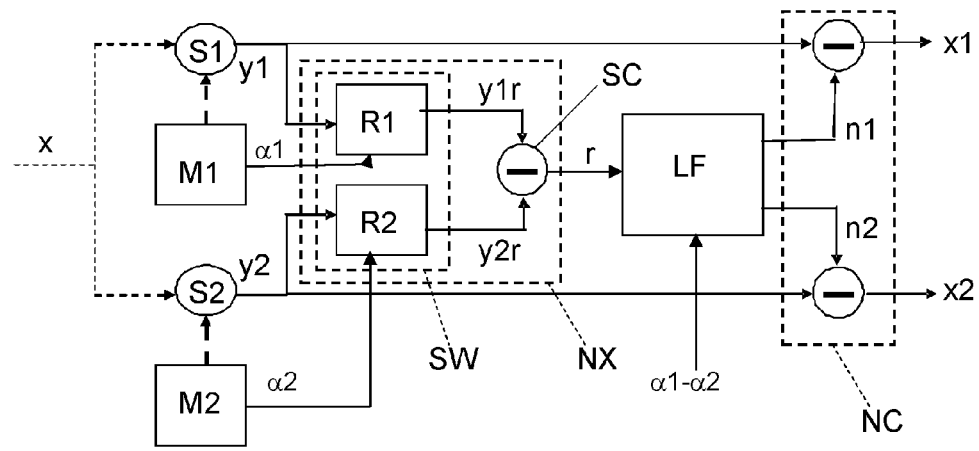
FIG. 1 shows a first embodiment of a measuring device according to the first aspect of the invention.

In the following detailed description numerous specific details are set forth in order to provide a thorough understanding of the present invention. However, it will be understood by one skilled in the art that the present invention may be practiced without these specific details. In other instances, well known methods, procedures, and components have not been described in detail so as not to obscure aspects of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

Like numbers and other references refer to like elements throughout. As used herein, the term "and/or" includes any and all combinations of one or more of the associated listed items.

It will be understood that, although the terms first, second, third etc. may be used herein to describe various elements, components, and/or sections, these elements, components, and/or sections should not be limited by these terms. These terms are only used to distinguish one element, component or section from another element, component, and/or section. Thus, a first element, component, and/or section discussed below could be termed a second element, component, and/or section without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. All publications, patent applications, patents, and other references mentioned herein are incorporated by reference in their entirety. In case of conflict, the present specification, including definitions, will control. In addition, the materials, methods, and examples are illustrative only and not intended to be limiting.

FIG. 1 shows a first embodiment of a measuring device for measuring a vectorial physical quantity x. The measuring device comprises at least a first and a second sensor S1, S2 each arranged for measuring a component of the vectorial physical quantity x and for generating a respective sense signal y1, y2, respectively.

In this case the vectorial physical quantity is an acceleration, and the sensors S1, S2 are each capable of measuring a first and a second component of the vectorial physical quantity, therewith obtaining a vectorial sense signal. The sense signals y1, y2 each include a first part indicative for the component of the measured quantity x and a second, noise part. The noise part has a contribution due to correlated noise and a contribution due to uncorrelated noise.

Typically the sensors have an Allan variance curve with a minimum for a particular integration time Tmin.

The measuring device according to the first aspect of the invention has an actuator M1 for causing a relative rotation between said at least a first and a second sensor. In the embodiment shown the measuring device has an actuator M1, M2 for each of the sensors S1, S2. In the embodiment shown it is presumed that the vectorial physical quantity is a two-dimensional physical quantity in a plane, and that the axis of highest sensitivity (primary axis) of sensor S1 has an instantaneous angle $\alpha1(t)$, further denoted as $\alpha1$ and that the axis of highest sensitivity of sensor S2 has an instantaneous angle $\alpha2(t)$, further denoted as $\alpha2$.

The measuring device according to the first aspect of the invention has a noise extraction unit NX for receiving the sense signals y1, y2 and for providing a difference signal r indicative for a weighted difference between the sense signals y1, y2. The weighted difference r is substantially independent of the vectorial physical quantity x. I.e. the weighted first signal parts wy1r, wy2r of the sensing signals cancel each other substantially, i.e. the Typically the ratio $$\frac{|wy1r - wy2r|^2}{|wy1r| \cdot |wy2r|} << 1$$

Wherein <<1 is understood to be less than 0.1, but preferably less than 0.01, preferably less than 0.001.

The noise extraction unit NX comprises a signal weighting unit SW for weighting the sense signals y1, y2 dependent on the relative rotation $\alpha1-\alpha2$, and provides mutually weighted sense signals y1r, y2r. The signal weighting unit SW has at least one multiplication unit for multiplying one of the sense signals with a weighting factor. In this embodiment signal weighting unit SW has a multiplication unit R1, R2 for weighting each of the sensed signals y1, y2, and the multiplication units are matrix multiplication units. The matrix multiplication unit R1 provides for a mathematical rotation of the sense signal y1 that compensates the physical rotational of the first sensor. The matrix multiplication unit R2 provides for a mathematical rotation of the sense signal y2 that compensates the physical rotation α2 of the second sensor S2.

The signal compensation unit SC receives the mutually weighted sense signals y1r, y2 from the signal weighting unit SW, and provides a difference signal r indicative for a difference between the mutually weighted sense signals. In this difference signal the first signal parts indicative for the sensed vectorial physical quantity cancel out each other. It is noted that the matrix multiplication units R1, R2 may apply an additional operation to each of the signals y1, y2. For example the matrix multiplication units R1, R2 may apply an additional common rotation β to each of the sensed signals or may multiply each of the signals with a common scale factor.

The measuring device comprises a low frequency noise estimator LF for estimating a low frequency noise component from the difference signal r and from information about the relative rotation α1-α2 between the sensors. The low frequency noise estimator generates an estimated noise signal n1 indicative for the value of the correlated noise in the noise part of the first sense signal y1. Additionally it generates an estimated noise signal n2 indicative for the estimated value of the correlated noise in the noise part of the second sense signal y2. The low frequency noise estimator has an effective integration time that is at least two times a sample frequency with which the sense signals are obtained and that is less than the smallest particular integration time of the sensor comprised in the measuring device. In particular the selected effective integration time is at most two times said second integration time, The measuring device comprises a correction unit NC for receiving the estimated noise signal n1 and the output signal y1 of one of the sensors S1 and for providing an output signal x1 indicative for a sensed value of the vectorial physical quantity corrected for the noise as estimated by said low frequency noise estimator LF.

The correction unit NC further receives the estimated noise signal n2 and the output signal y2 the other sensor and provides a further output signal x2 indicative for a sensed value of the vectorial physical quantity corrected for the noise as estimated by said low frequency noise estimator LF.

The rotated sensors S1, S2 each provide a proper sensing signal y1, y2 that is indicative for the sensed value of the vectorial physical quantity according to the relations:

$$y1 = M\alpha 1 * x + n1$$

$$y2 = M\alpha 2 * x + n2$$

The sensed signals y1 and y2 differ because of the different physical rotations Mα1, Mα2 of each sensor and the sensor noise n1, n2, including LF-correlated noise n1c, n2c introduced by the sensors S1, S2. Therein Mα1, Mα2 represent the matrices corresponding to the rotations α1, α2 applied to the sensors S1, S2 by their actuators M1, M2. Numerically, y1 and y2 are rotated back using matrices Rα1 and Rα2, corresponding to the reverse rotations −α1, −α2. Accordingly Rα1=(Mα1)$^{-1}$, and Rα2=(Mα2)$^{-1}$ After reverse rotation of the signals y1, y2 the following signals y1r, y2r are obtained.

$$y1r = R\alpha 1 * M\alpha 1 * x + R\alpha 1 * n1$$

$$y2r = R\alpha 2 * M\alpha 2 * x + R\alpha 2 * n2$$

Both results yield the original quantity x plus additional sensor noise n1, n2 which is numerically rotated over Rα1 and Rα2. From the difference r of both signals (the residual), x is removed and only the individual noises (rotated over Rα1 and Rα2) remain.

$$r \sim R\alpha 1 * n1 - R\alpha 2 * n2$$

An LF-noise estimator estimates the correlated low frequency part of the noise (only the non-white part of the LF-noise), resulting in n1c and n2c. The measurements result in an overdetermined system of equations:

$$r(i) = R\alpha 1(i) * n1 - R\alpha 2(i) * n2$$

the value n1, n2 are selected that minimize $$\Delta = \sum_i (r(i) - R\alpha 1(i) * n1 - R\alpha 2(i) * n2)^2$$

The estimations n1 and n2 are then subtracted from the measured quantities y1 and y2, yielding the corrected quantities x1, x2 from which a large part of the LF-noise is removed.

Figure 2:
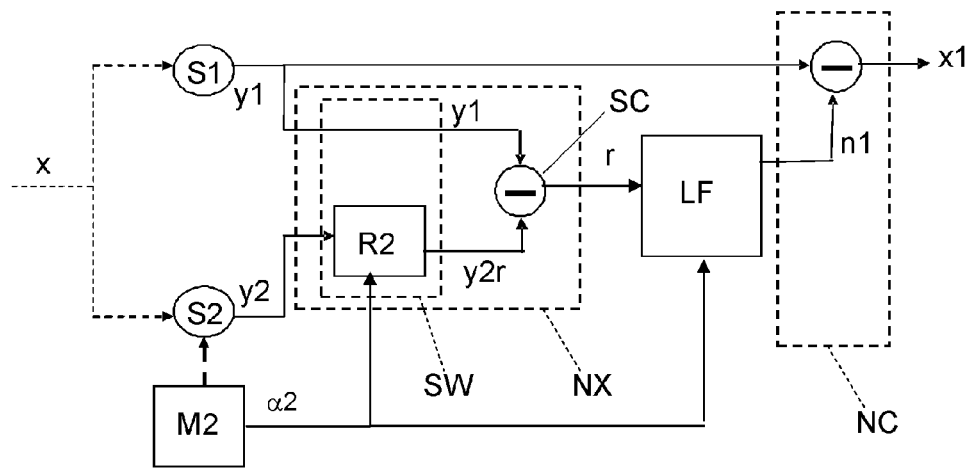
FIG. 2 shows a second embodiment of a measuring device according to the first aspect of the invention.

FIG. 2 shows a second embodiment of a measuring device according to the first aspect of the invention. The embodiment of FIG. 2 differs from the embodiment of FIG. 1 in that only one of the sensors S2 is rotated. The other sensor S1 is maintained in a fixed orientation with respect to the reference frame of the measuring device. In this case the signal weighting unit SW comprises a single matrix multiplication unit R2 that numerically inverts the rotation α2 imparted by motor M2 to sensor S2. Accordingly in this case a set of weighted sense signals y1, y2r is obtained by weighting only one of the sense signals y2. The correction unit NC receives the estimated noise signal n1 and the output signal y1 of sensor S1 and provides an output signal x1 indicative for a sensed value of the vectorial physical quantity corrected for the noise as estimated by said low frequency noise estimator LF. The sense signal of the second sensor S2 is not corrected. In another embodiment also this sense signal may be corrected.

In the embodiment of FIG. 2 the output signal y1 relates to the vectorial physical quantity x as:

$$y1 = x + n1$$

Therein n1 is a noise contribution which comprises a correlated component n1c and an uncorrelated component n1u. The correlated contribution n1c is a noise contribution having a frequency spectrum $1/f^\beta$, wherein β typically is in a range from 1 to 2.

And the output signal y2 relates to the vectorial physical quantity x as:

$$y2 = M\alpha 2 * x + n2$$

Likewise n2 is a noise contribution which comprises a correlated component n2c and an uncorrelated component n2u.

Associated with the second sensor S2 is the matrix multiplication unit R2 that processes the sensing signal y2 of the second sensor S2 to correct for the effect of the rotation with respect to the reference frame. Accordingly the signal is transformed by a rotation matrix $R\alpha 2$ that is inverse to the rotation matrix $M\alpha 2$ defined by the rotation $\alpha$ applied to the second sensor S2.

The weighted sense signal y2r obtained therewith relates to the output signal y2 as:

$$y2r = R\alpha 2 * y2,$$

Accordingly $y2r = x + R\alpha 2 * n2$

Each combination of a sense signal y1 of sensor S1 and an associated corrected sense signal y2r of sensor S2 provides a pair of independent observations, provide that the subsequent angles $\alpha$ differ. Good results are already obtained for angles selected from a set of two predetermined angles, e.g. {0,90}, however, even better results are obtained when the set of predetermined angles is larger.

The difference between these independent observations is a residue signal r, wherein:

$$r = n1c + n1u - R\alpha 2*(n2c + n2u)$$

$R2*n2c$ is again a correlated noise contribution and $R2*n2u$ is an uncorrelated contribution.

The LF noise estimator estimates the correlated noise components n1c, n2c from a sequence of pairs of independent observations.

Various options are available to carry out the estimation. According to a first option a least squares estimation method is used to estimate the correlated noise components from a sequence of measurements.

$$r_i = n1c_i + n1u_i - R\alpha 2_i*(n2c_i + n2u_i)$$

The components $n1c_i$, $n2c_i$ are estimated by En1c, En2c by minimizing the sum of squared errors over N observed pairs. The N observed pairs may be taken from a sliding window, or may be taken blockwise.

$$S = \sum_{i=1}^{N} (r_i - n1c_i - n1u_i - R\alpha 2_i * n2c_i - R\alpha 2_i * n2u_i)^2$$

En1c, En2c are the values of n1c, n2c for which dS/dn1c and dS/dn2c=0,
This results in the following equations:

$$\frac{dS}{dn1c} = -2\sum_{i=1}^{N} (r_i - n1c_i - n1u_i - R\alpha 2_i * n2c_i - R\alpha 2_i * n2u_i) = 0$$

$$\frac{dS}{dn2c} = -2\sum_{i=1}^{N} R\alpha 2_i * (r_i - n1c_i - n1u_i - R\alpha 2_i * n2c_i - R\alpha 2_i * n2u_i) = 0$$

As the components $n1u_i$, $n2u_i$ are uncorrelated these equations simplify to:

$$\frac{dS}{dn1c} = -2\sum_{i=1}^{N} (r_i - n1c_i - R\alpha 2_i * n2c_i) = 0$$

$$\frac{dS}{dn2c} = -2\sum_{i=1}^{N} R\alpha 2_i * (r_i - n1c_i - R\alpha 2_i * n2c_i) = 0$$

Presuming that n1ci, n2ci are constant with estimated value En1c, En2c during the interval wherein the N pairs are taken, the following equations remain:

$$\sum_{i=1}^{N} r_i = N*En1c + \left(\sum_{i=1}^{N} R\alpha 2_i\right)*En2c$$

$$\left(\sum_{i=1}^{N} R\alpha 2_i\right)*r_i = \left(\sum_{i=1}^{N} R\alpha 2_i\right)*En1c + \left(\sum_{i=1}^{N} R\alpha 2_i R\alpha 2_i\right)*En2c$$

The time interval Tint wherein the samples i=1, . . . , N are obtained is the effective integration time of the system. The effective integration time is at least two times a sample frequency with which the sense signals are obtained. The effective integration time is less than the particular integration time (Allan minimum time) of the sensors comprised in the measuring device. Typically identical sensors S1, S2 are applied that have the same properties. It is conceivable that different sensors are used. In that case the effective integration time of the low frequency noise estimator LF is less than the smallest particular integration time of each of the sensors S1, S2 comprised in the measuring device and for each of said sensors it holds that the Allan variance for the effective integration time is at least 3 dB higher than its Allan variance minimum.

In an implementation of this embodiment wherein the vectorial physical quantity is a two-dimensional physical quantity, the sensors S1, S2 each have two sensor elements. The two sensor elements of each sensor are preferably arranged orthogonally with respect to each other, i.e. their directions of maximum sensitivity are arranged orthogonally with respect to each other.

In an implementation of this embodiment wherein the vectorial physical quantity is a three-dimensional physical quantity, the sensors S1, S2 each have three sensor elements. The three sensor elements of each sensor are preferably arranged orthogonally with respect to each other, i.e. their directions of maximum sensitivity are arranged orthogonally with respect to each other.

Nevertheless it is sufficient that the total number of sensor elements amounts to the number of dimensions plus one. If the direction of the vectorial physical quantity is known, a total number of two sensor elements is sufficient as is further described with reference to FIG. 6 for example.

Figure 3:
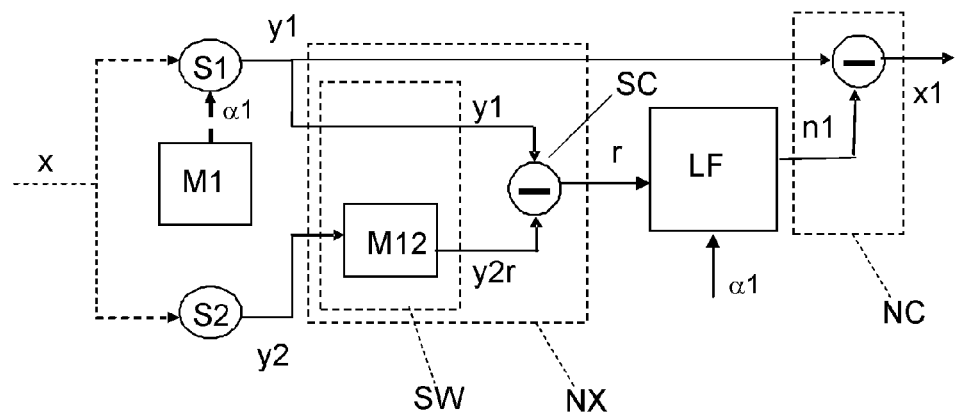
FIG. 3 shows a third embodiment of a measuring device according to the first aspect of the invention.

FIG. 3 shows a third embodiment of a measuring device according to the first aspect of the invention. This third embodiment is a variant of the second embodiment. Therein the first sensor S1 is physically rotated by a motor M1. The weighting unit SW comprises a matrix multiplication unit M12 that numerically rotates the second sense signal y2 over an angle $\alpha 1$ corresponding to the angle with which the first sensor S1 is rotated. In this embodiment the corrected sense signal x1 is rotated over angle $\alpha 1$. This can be compensated by an inverse rotation of the output signal x1.

Figure 4:
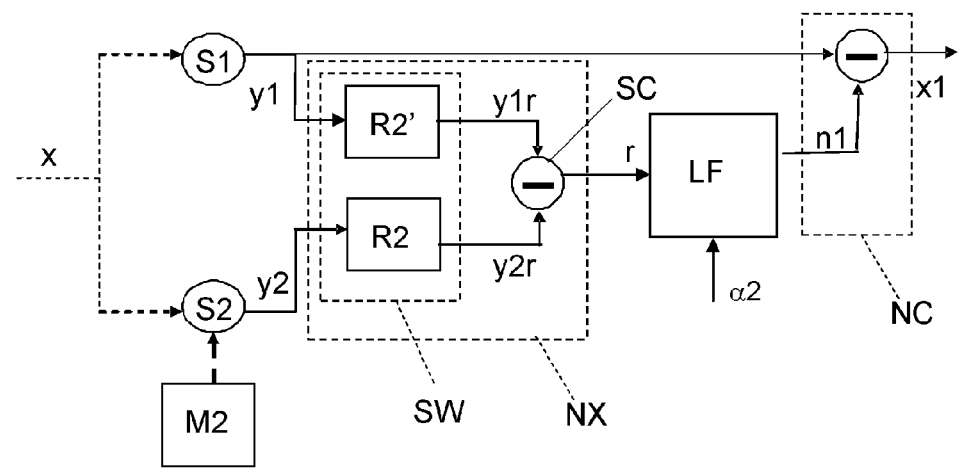
FIG. 4 shows a fourth embodiment of a measuring device according to the first aspect of the invention.

FIG. 4 shows a fourth embodiment. Therein the measuring device comprises a first sensor S1 that is fixed with respect to the reference frame of the measuring device and a second rotating sensor S2.

In this embodiment the first sensor S1 comprises a first and a second sensor element and the second sensor S2 comprises a third sensor element.

The output of the first sensor is:

$$y1 = x + n1$$

Written out in components:

$$y1_1 = x_1 + n1_i$$

$$y1_2 = x_2 + n1_2$$

The output of the third sensor element of the second sensor is:

$$y2 = x_1 \cdot \cos(\alpha) + x_2 \cdot \sin(\alpha) + n_2$$

The inverse rotation by R2 results in:

$$y2r_1 = x_1 \cdot \cos^2(\alpha) + x_2 \cdot \cos(\alpha) \cdot \sin(\alpha) + n_2 \cdot \cos(\alpha)$$

And $$y2r_2 = -x_1 \cdot \sin(\alpha) \cdot \cos(\alpha) - x_2 \cdot \sin^2(\alpha) - n_2 \cdot \sin(\alpha)$$

By applying a second transformation R2' to the signal y1 of the first sensor arrangement the following result is obtained.

$$y1r_1 = x_1 \cdot \cos^2(\alpha) + x_2 \cdot \cos(\alpha) \cdot \sin(\alpha) + n1_1 \cdot \cos^2(\alpha) + n1_2 \cdot \cos(\alpha) \cdot \sin(\alpha)$$

$$y1r_2 = -x_1 \cdot \sin(\alpha) \cdot \cos(\alpha) - x_2 \cdot \sin^2(\alpha) - n1_1 \cdot \sin(\alpha) \cdot \cos(\alpha) - n1_2 \cdot \sin^2(\alpha)$$

Accordingly the difference signal is:
r=y1r−y2r, having the following components:

$$r_1 = n1_1 \cdot \cos^2(\alpha) + n1_2 \cdot \cos(\alpha) \cdot \sin(\alpha) - n_2 \cdot \cos(\alpha)$$

$$r_2 = -n1_1 \cdot \sin(\alpha) \cdot \cos(\alpha) - n1_2 \cdot \sin^2(\alpha) + n_2 \cdot \sin(\alpha)$$

This system of equations has three unknown noise components, each having a low-frequency correlated noise contribution. Accordingly by determining the difference signal for different values of α also in this case the low-frequency noise contributions can be estimated.

Figure 5:
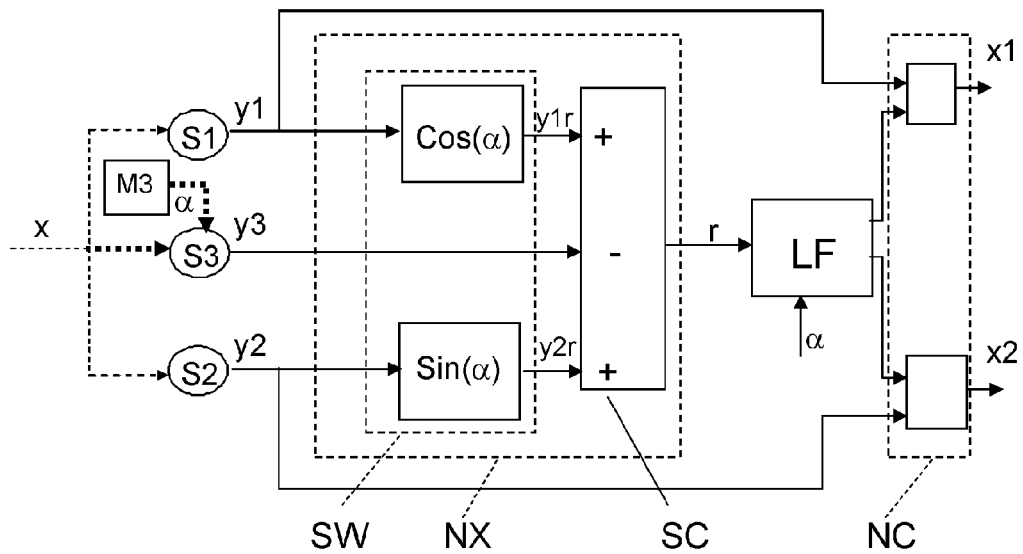
FIG. 5 shows a fifth embodiment of a measuring device according to the first aspect of the invention.

FIG. 5 shows a fifth embodiment. In this embodiment the measuring device has three sensors.

A first sensor S1 aligned according to a first main axis of the reference frame of the measuring device.

A second sensor S2 aligned according to a second main axis of the reference frame of the measuring device. The second main axis is preferably orthogonal to the first axis.

A third, rotating sensor S3.
The vectorial physical quantity to be measured is represented by $$x = \begin{pmatrix} x_1 \\ x_2 \end{pmatrix}$$

The first sensor generates a signal $$y1 = x_1 + n1$$

The second sensor generates a signal $$y2 = x_2 + n2$$

The third, rotating sensor generates the signal:

$$y3 = x_1 \cos(\alpha) + x_2 \sin(\alpha) + n3$$

The weighting unit SW calculates the following weighted signals $$y1r = y1 \cdot \cos(\alpha) = x1 \cdot \cos(\alpha) + n1 \cdot \cos(\alpha)$$

$$y2r = y2 \cdot \sin(\alpha) = x2 \cdot \sin(\alpha) + n2 \cdot \sin(\alpha)$$

The weighted set of signals y1r, y2r, y3 is summed in the signal compensation unit SC.
This results in:

$$r = n1 \cdot \cos(\alpha) + n2 \cdot \sin(\alpha) - n3$$

Accordingly the sum calculated by the compensation unit is independent of the measured quantity and is only a function of the noise n1, n2, n3.

By measuring for a plurality of different angles α an overdetermined system of equations is obtained that can be used to estimate the contribution of the correlated noise.

Figure 6:
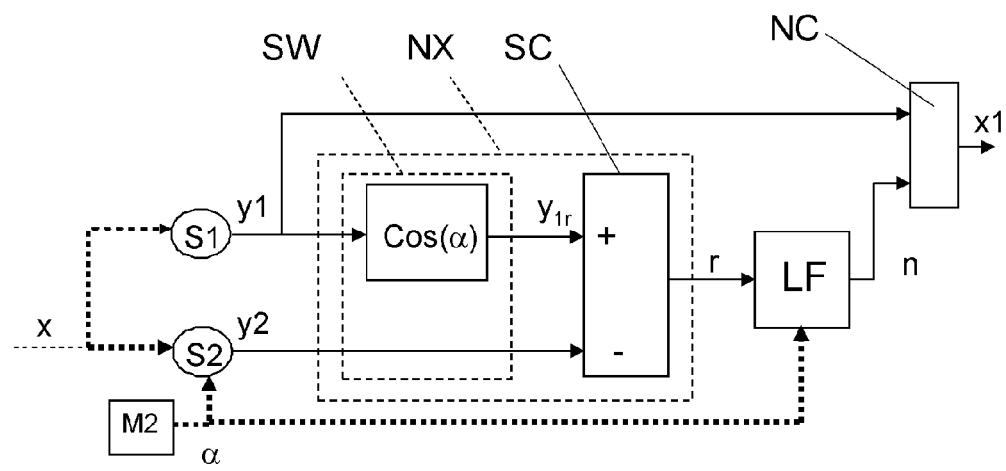
FIG. 6 shows a sixth embodiment of a measuring device according to the first aspect of the invention.

With reference to FIG. 6 a sixth embodiment of a measurement device according to the first aspect is described for use in an application wherein the vectorial quantity to be measured has a known direction. This is for example the case in an application for micro-gravimetry. In this case it is sufficient that the measuring device has two sensors.

In this particular embodiment the first sensor S1 has a fixed orientation. In particular the first sensor S1 has its direction of maximum sensitivity aligned with the vectorial quantity to be measured.

The second sensor S2 is rotated with respect to the first sensor S1. In particular the second sensor is rotated with its direction of maximum sensitivity around a rotation axis transverse to the vectorial quantity to be measured.

In this application the vectorial physical quantity to be measured is represented by $$x = \begin{pmatrix} x_1 \\ 0 \end{pmatrix}$$

The first sensor generates a signal $$y1 = x_1 + n1$$

The second sensor generates the signal:

$$y2 = x_1 \cos(\alpha) + n2$$

The signal weighting unit SW calculates the weighted signal $$y1r = x_1 \cos(\alpha) + n1 \cdot \cos(\alpha)$$

And provides the weighted pair of signals y1r, y2 to the signal compensation unit SC.
The signal compensation unit SC calculates the residue signal r, with $$r = y1r - y2$$

This results in:

$$r = n1 \cdot \cos(\alpha) - n2$$

Accordingly the sum calculated by the compensation unit is independent of the measured quantity and is only a function of the noise n1, n2.

By measuring for a plurality of different angles α an overdetermined system of equations is obtained that can be used to estimate the contribution of the correlated noise.

It is not necessary that the rotation is performed continuously. Neither is it necessary that the rotation is carried out around a single axis. It is merely relevant that the measurement results in mutually independent equations for the noise part of the signals.

Various alternative methods are available for estimating the correlated low frequency noise. One such embodiment is a Kalman-filter, which is implemented here by the following repeated sequence of operations:

$$P_{k-1} = P_k$$

$$x_{k-1} = x_k$$

$$P_{k,pred} = \Phi \cdot P_{k-1} \cdot \Phi^T + Q \quad \text{(predict covariance)}$$

$$P_{res} = H \cdot P_{k,pred} \cdot H^T + R \quad \text{(Innovation covariance)}$$

$K_{gain} = P_{k,pred} \cdot H^T \cdot P_{res}^{-1}$ (Gain)

$P_k = (I - K_{gain} \cdot H) \cdot P_{k,pred}$ (Updated covariance)

$Re\ s = y - H \cdot \Phi \cdot x_{k-1}$ (Residue)

$x_k = \Phi \cdot x_{k-1} + K_{gain} \cdot Re\ s$ (Updated state estimate)

Figure 7:
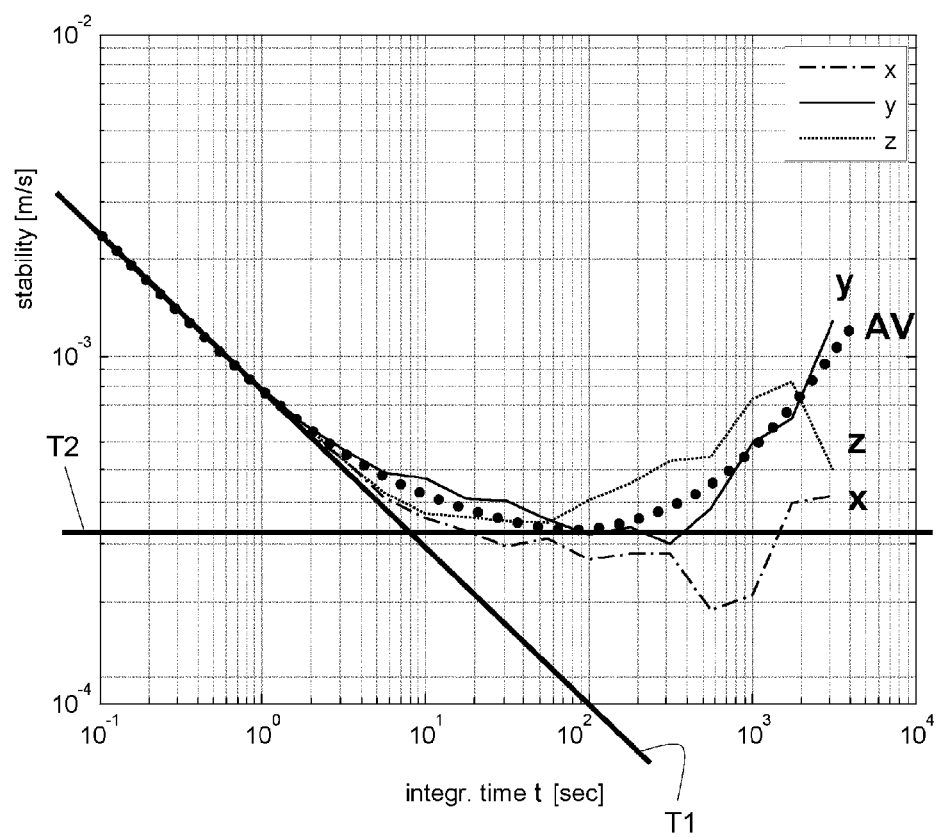
FIG. 7 shows various characteristics of a sensor used in embodiments of the measuring device.

The matrix H is defined by H=I−Rbe, wherein Rbe is the rotation matrix. In a number of experiments (NR=1, ... 17) a reduction of the amplitude of the noise in the corrected signal x1 was determined for the measuring device in FIG. 2 with different implementations and settings of its LF noise filter. The measurements were carried out with an acceleration sensor of type MTi-G of Xsens. The sensor S1, S2 were arranged in a fixed reference frame so that the signals generated by the sensors only have a noise part. For one of the sensors the measured signals x, y, z are indicated in FIG. 7 as a function of the integration time t. Also the Allan variance curve AV for this sensor is shown in FIG. 7. As can be seen in FIG. 7, the Allan variance curve has a minimum for a standard deviation of 3.4 m/s$^2$ at a first particular integration time, the Allan minimum time of about 70 sec. The first tangent line T1 has a crossing with the horizontal line T2 through the Allan minimum at a second particular integration time of 8 sec.
The sample frequency Ts was 0.01 sec.

The implementation of the LF noise filter in the experiments is indicated in column LF by LS for a least squares filter and by KM for a Kalman filter. In the experiments it is presumed that the first sensor S1 is maintained in a fixed orientation with respect to the reference frame and that the other sensor S2 is rotated with a rotation period as indicated in the column Tomw. The effective integration time of the LF noise filter is shown in column Tint. The parameters of the Kalman filter are indicated in the columns Φ, Q, R, x0 and P0.
Therein Φ is the system matrix, which is the 4-dimensional identity matrix in each of the experiments.

Q is the system covariance matrix, which is the 4-dimensional identity matrix multiplied by a scalar which is varied.

R is the measurement covariance matrix, here the 2D identity matrix times a scalar, here $2 \cdot 10^{-4}$.

X0 is the initial state estimate factor, which is set to (0,0,0,0).

P0 is the state covariance matrix, which is the 4D identity matrix times a scalar.

Experiment 1

Figure 8:
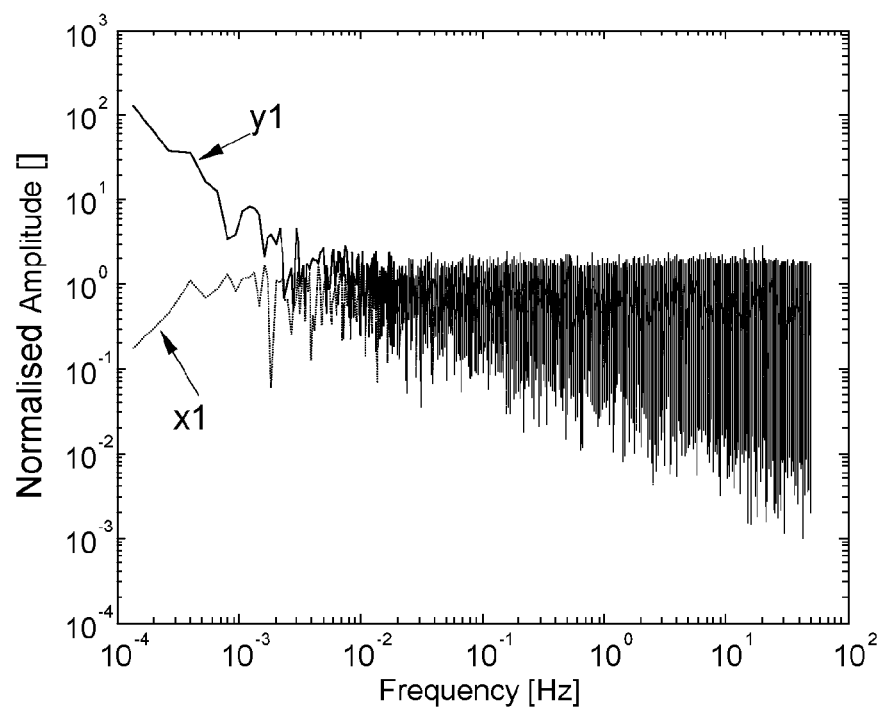
FIG. 8 shows a measurement results obtained with a first experiment.

FIG. 8 shows the result of a first experiment. The experiment involves a full revolution of the sensor with a revolution time Tomw of 2 sec. The LF filter is a least squares with an integration time Tint=2 sec. FIG. 8 shows the frequency spectrum of the original uncorrected sensor signal y1 and the spectrum of the corrected signal x1. After correction, the spectrum is completely flat at (almost) the same level of the white noise in the upper frequency band. The method therefore nearly perfectly estimates and corrects the LF-noise.

Experiment 2

Figure 9:
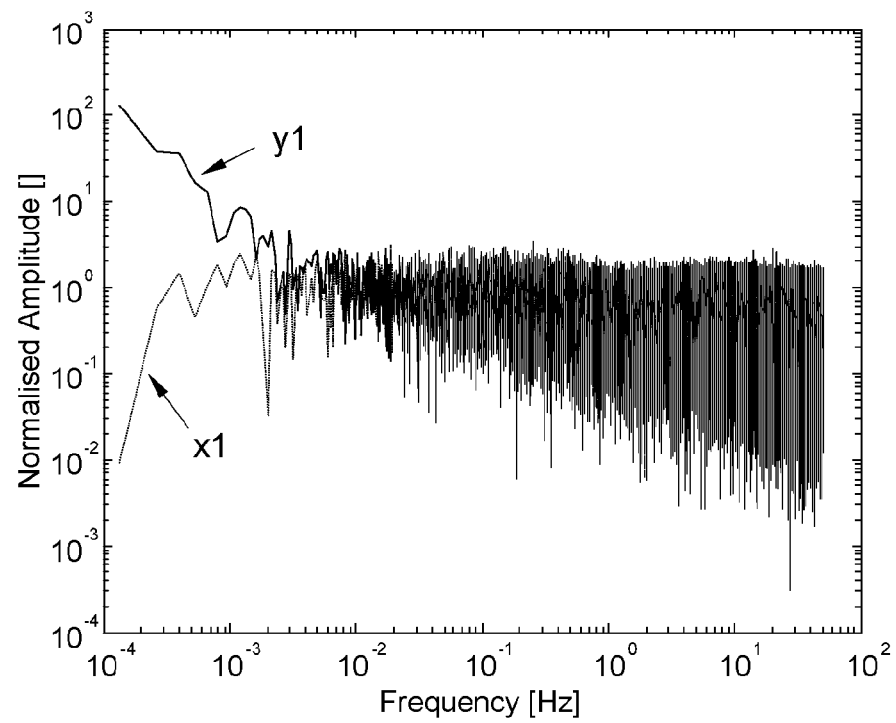
FIG. 9 shows a measurement results obtained with a second experiment.
Figure 10:
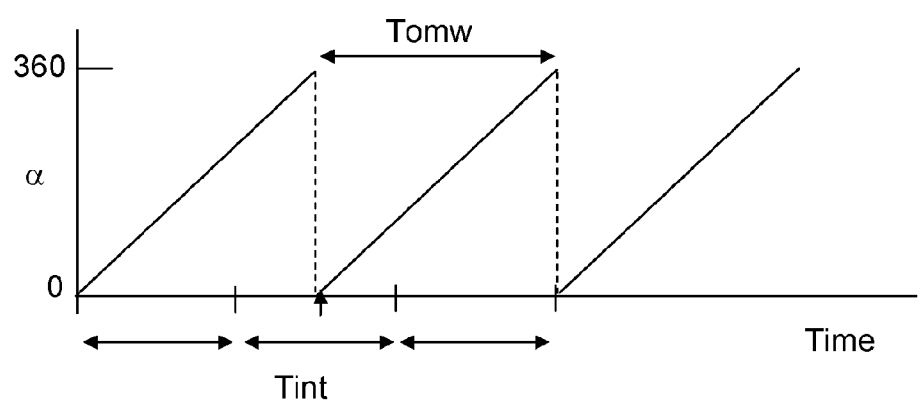
FIG. 10 illustrates a condition used in said second experiment.

In experiments 2, 3 and 4 the integration time Tint is a fraction of the rotation time Tomw as schematically shown in FIG. 10. FIG. 9 shows the result of the second experiment wherein the integration time is set to 1 sec, corresponding to Tomw/2. The other parameters are the same as in experiment 1. A slight increase of the noise level below 1 Hz is observable. This is explained in that due to the decreased integration time, the LF-noise is only observed over the interval 0-180 degrees, resulting in a less optimal estimation.

Experiment 3

Figure 11:
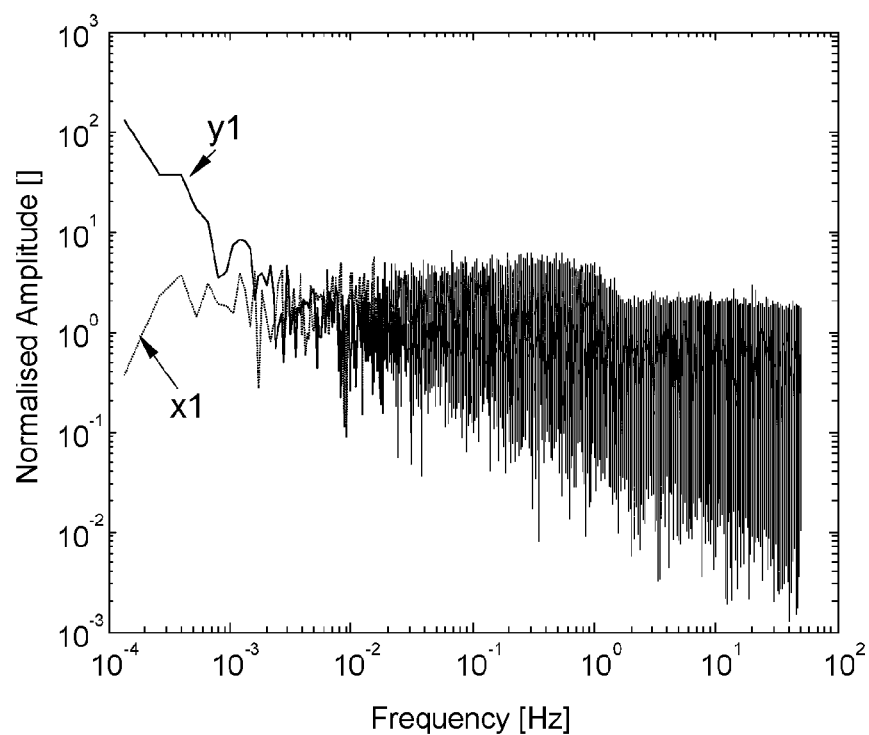
FIG. 11 shows a measurement results obtained with a third experiment.

FIG. 11 shows the result of a third experiment with Tint=0.5 sec. The other parameters are the same as in experiment 1. Again the noise level below 1 Hz has increased.

Experiment 4

Figure 12:
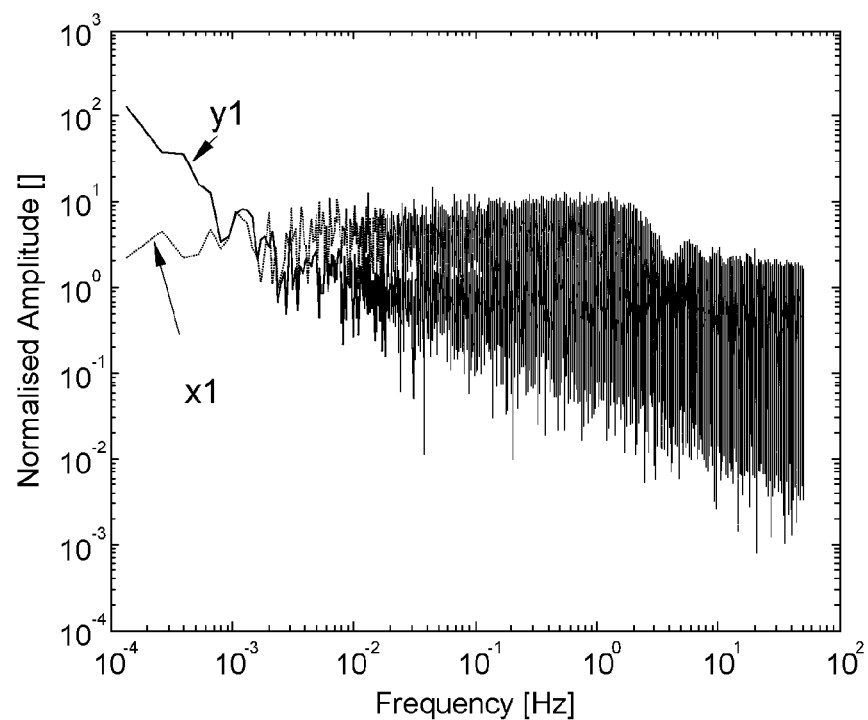
FIG. 12 shows a measurement results obtained with a fourth experiment.

FIG. 12 shows the result of a further experiment with Tint=0.25 sec. Again the noise level has increased. These experiments confirm that in the optimal situation the LF-noise/bias should be observed over a wide range of angles.

Experiment 5

Figure 13:
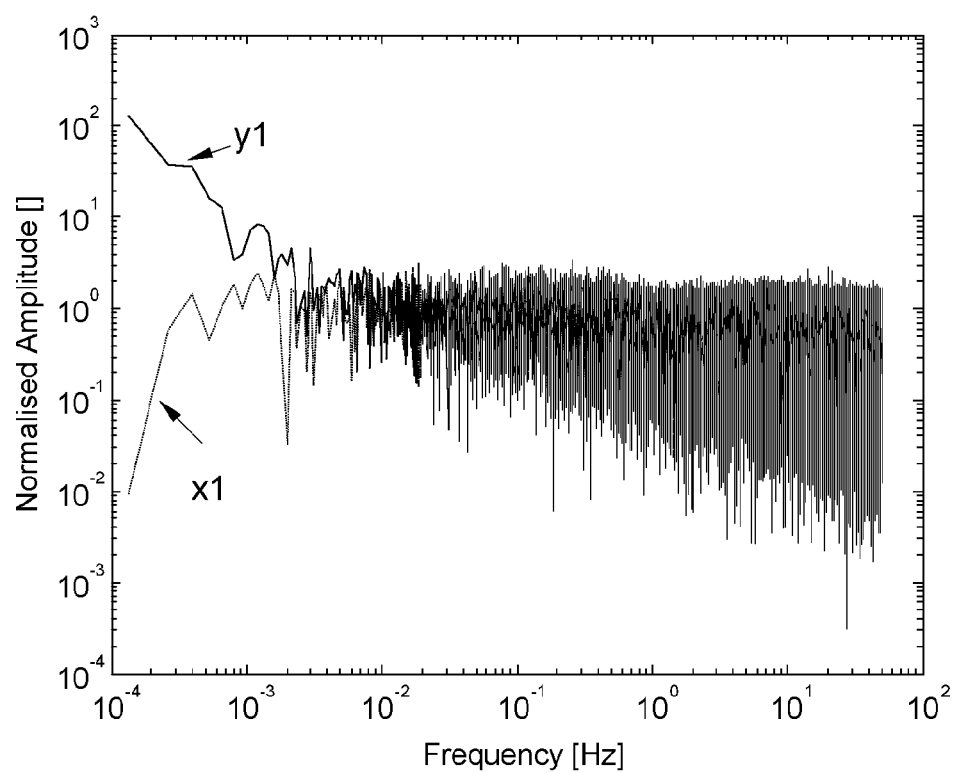
FIG. 13 shows a measurement results obtained with a fifth experiment.
Figure 14:
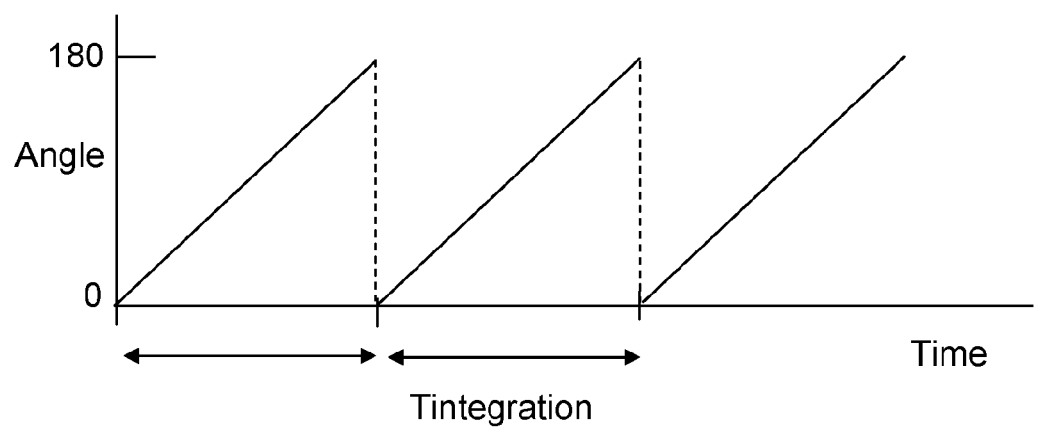
FIG. 14 illustrates a condition used in said fifth experiment.

FIG. 13 shows the result of an experiment with an integration time Tint=1 s. A rotation is simulated wherein the second sensor rotates according to a sawtooth profile as shown in FIG. 14 over a range from 0-180 degr with a repetition period of 1 s. Accordingly the angular speed is the same as in previous experiments. The results shown in FIG. 14 are similar to the results obtained in the experiment with

| NR | LF | Tomw | Tint | Φ | Q | R | x0 | P0 |
|---|---|---|---|---|---|---|---|---|
| 1 | LS | 2 | 2 | | | | | |
| 2 | LS | 2 | 1 | | | | | |
| 3 | LS | 2 | 0.5 | | | | | |
| 4 | LS | 2 | 0.25 | | | | | |
| 5 | LS | ½ in 1 s | 1 | | | | | |
| 6 | LS | 0.5 | 0.5 | | | | | |
| 7 | LS | 4 | 4 | | | | | |
| 8 | LS | 10 | 10 | | | | | |
| 9 | KM | 2 | 0.14 | I(4) | I(4) * 1e−6 | I(2) * 2e−4 | (0, 0, 0, 0) | I(4) * 1e−2 |
| 10 | KM | 2 | 140 | I(4) | I(4) * 1e−12 | I(2) * 2e−4 | (0, 0, 0, 0) | I(4) * 1e−4 |
| 11 | KM | 2 | 14 | I(4) | I(4) * 1e−10 | I(2) * 2e−4 | (0, 0, 0, 0) | I(4) * 1e−4 |
| 12 | KM | 2 | 1.4 | I(4) | I(4) * 1e−8 | I(2) * 2e−4 | (0, 0, 0, 0) | I(4) * 1e−4 |
| 13 | KM | Random | 1.4 | I(4) | I(4) * 1e−8 | I(2) * 2e−4 | (0, 0, 0, 0) | I(4) * 1e−4 |
| 14 | KM | 4 × 90 | 1.4 | I(4) | I(4) * 1e−8 | I(2) * 2e−4 | (0, 0, 0, 0) | I(4) * 1e−4 |
| 15 | KM | 3 × 120 | 1.4 | I(4) | I(4) * 1e−8 | I(2) * 2e−4 | (0, 0, 0, 0) | I(4) * 1e−4 |
| 16 | KM | 2 × 180 | 1.4 | I(4) | I(4) * 1e−8 | I(2) * 2e−4 | (0, 0, 0, 0) | I(4) * 1e−4 |
| 17 | KM | 2 × 90 | 1.4 | I(4) | I(4) * 1e−8 | I(2) * 2e−4 | (0, 0, 0, 0) | I(4) * 1e−4 | a full revolution with rotation time Tomw=2 sec and Tint=1 sec. This confirms the fact that observations preferably are done over the complete angular range for optimal results. Apparently, it is further not relevant over which part of the angular range the observations are taken (e.g. 0-50, 50-100 or 120-170 degrees).

Experiment 6

Figure 15:
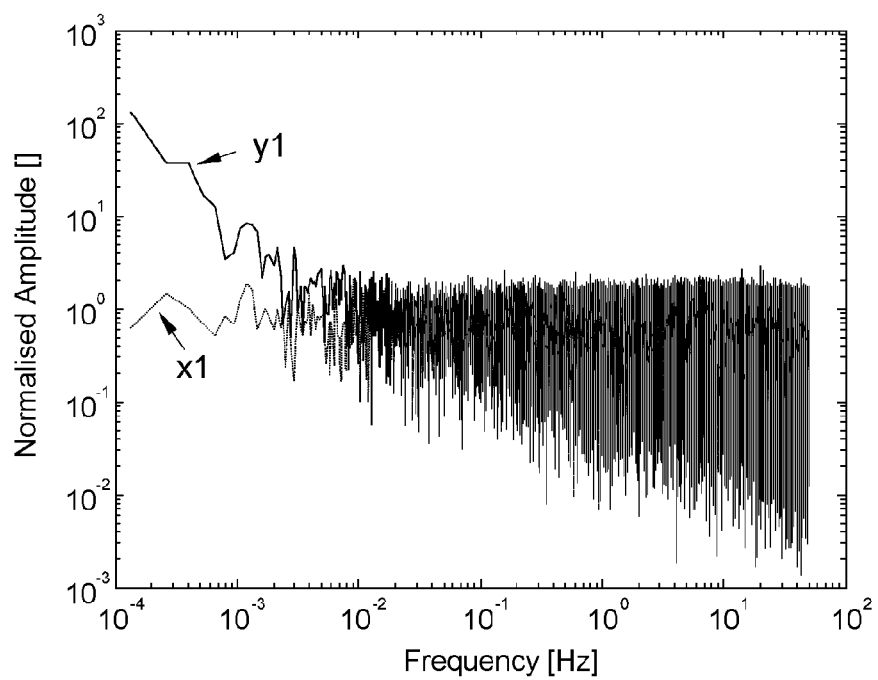
FIG. 15 shows a measurement results obtained with a sixth experiment.

In experiment 6, shown in FIG. 15, the rotation time Tomw for a full rotation and the integration time Tint are both set at 0.5 sec. Accordingly the angular speed is increased by a factor 2. The results are almost identical as with Tomw=Tint=2 sec. in experiment 1.

Experiment 7

Figure 16:
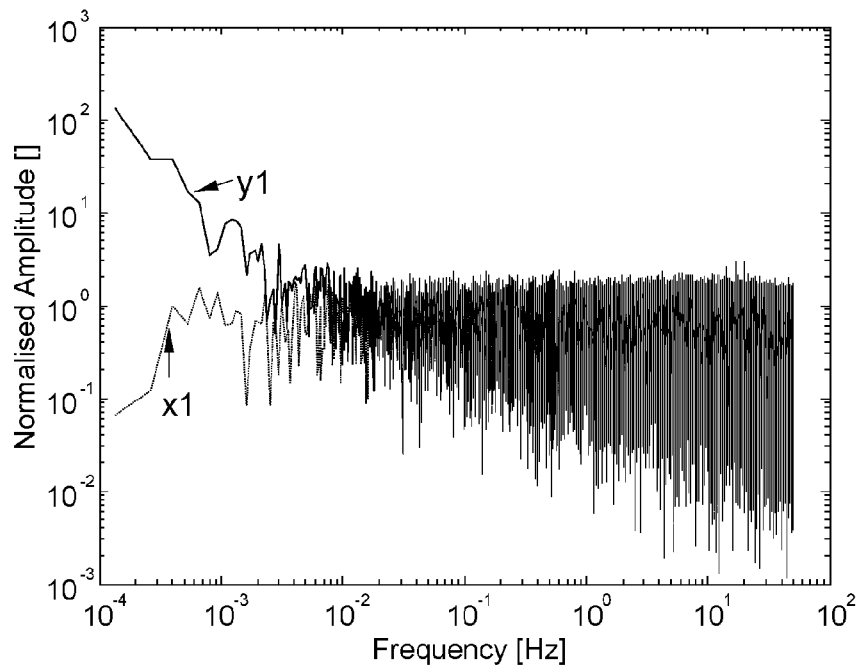
FIG. 16 shows a measurement results obtained with a seventh experiment.

In experiment 7, shown in FIG. 16 the rotation time Tomw for a full rotation and the integration time Tint are both set at 4 sec. Accordingly the angular speed is decreased by a factor 2 as compared to experiment 1.

Experiment 8

Figure 17:
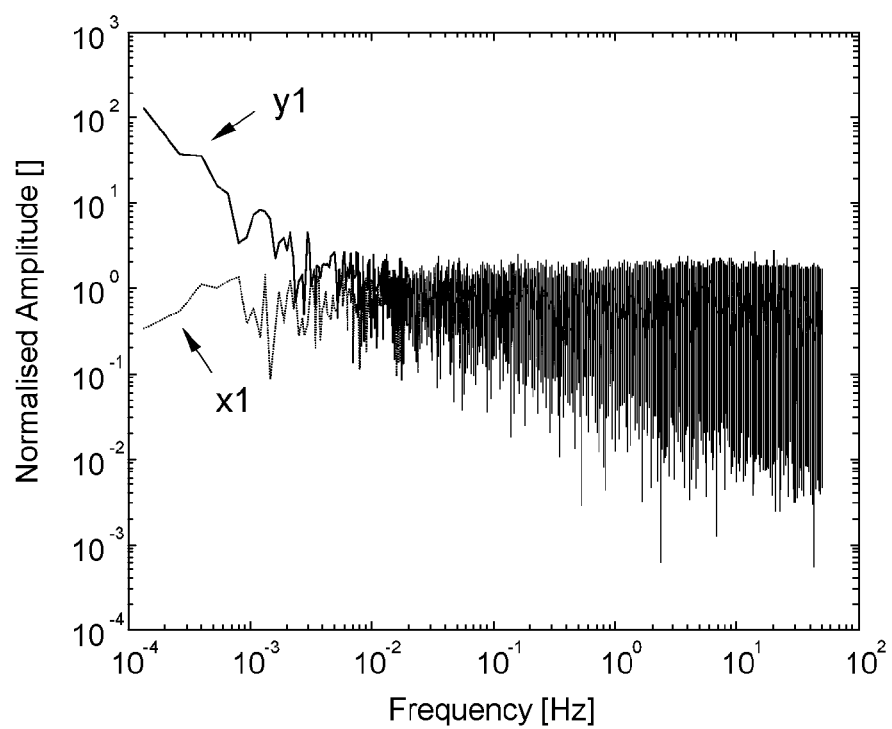
FIG. 17 shows a measurement results obtained with an eighth experiment.

In experiment 8, shown in FIG. 17 the rotation time Tomw for a full rotation and the integration time Tint are both set at 10 sec. Accordingly the angular speed is decreased by a factor 5 as compared to experiment 1.
Based on experiments 1 to 8 the following is concluded.
An optimal result is obtained if the angular displacement is linear (so all angles are equally often used), covers a full circle and the Integration time corresponds to the revolution time (Tomw=Tint).
Only the correlated part of the noise, spectrally below the revolution frequency, is estimated and white (uncorrelated) noise remains spectrally flat up till DC.
The revolution frequency should be sufficiently high with respect to the bandwidth of the LF-noise signal. An exact criterium for this cannot be given as it depends on the spectral distribution of the LF-noise with respect to the white noise.
A number of experiments (9 to 17) were carried out with a Kalman Filter as the low-pass filter. Relevant parameter settings for the Kalman Filter, as also indicated in the table above, are:
System matrix Φ (here the 4D unity matrix);
System covariance matrix Q (4D unity matrix, with various settings of scale factor $k_Q$);
Measurement noise covariance matrix R (2D unity matrix, scale factor $k_R$=2E-4);
Initial state estimate vector x0 (0,0,0,0);
State covariance matrix P0 (4D unity matrix, with scale factor E-2 or E-4);
The effective integration time for the Kalman filter is estimated here as the product of the sampling time Ts with the square root of the ratio defined by the noise covariance scale factor $k_R$ divided by the system covariance scale factor $k_Q$.

$$Tint = Ts\sqrt{\frac{k_R}{k_Q}}$$

Experiment 9

Figure 18:
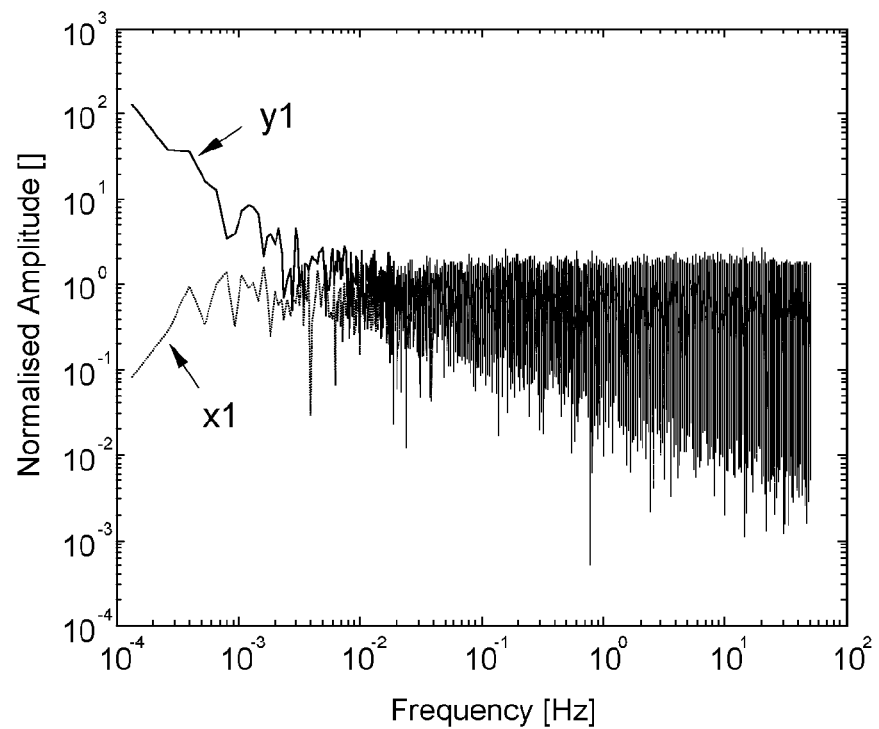
FIG. 18 shows a measurement results obtained with a ninth experiment.

Results of experiment 9 are shown in FIG. 18. In this experiment the rotation time Tomw of the rotating sensor was set at 2 sec, as in the first experiment. As can be seen in the table above, the scale factor of the system covariance matrix Q is set at 1E-6 and the scale factor of the state covariance matrix P0 is set at 1E-2. The effective integration time in this case is 0.14 s. The results appear to be at least as good as the results obtained with the least squares method for the same sensor settings in experiment 1.

Experiment 10

Figure 19:
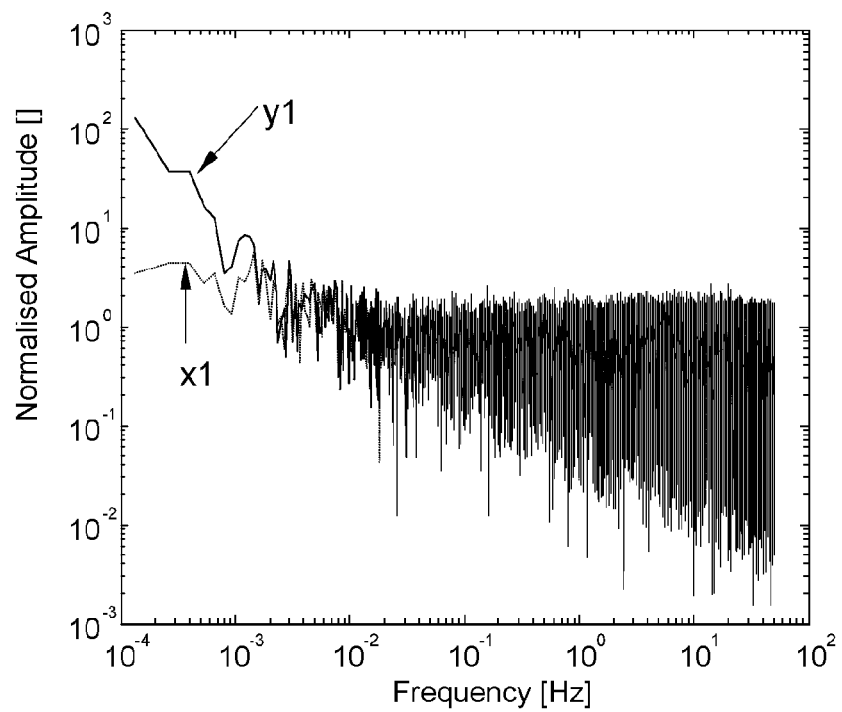
FIG. 19 shows a measurement results obtained with a tenth experiment.

Results of experiment 10 are shown in FIG. 19. The settings in this experiment differ from those of experiment 9, in that the scale factor of the system covariance matrix Q is set at 1E-12 and the scale factor of the state covariance matrix P0 is set at 1E-4. In this case the scale factor of Q has a relatively high value corresponding to a relatively long effective integration time Tint of 140 s, which is clearly longer than two times the second particular integration time, and also longer than the Allan minimum time. This corresponds to low-pass filtering with low bandwidth. The first of the two plots is the frequency spectrum before and after correction. In this case only the very low frequent part of the correlated noise signal is estimated. This has the effect that the noise floor at very low frequencies is almost a factor 10 above the (optimal) noise floor.

Experiment 11

Figure 20:
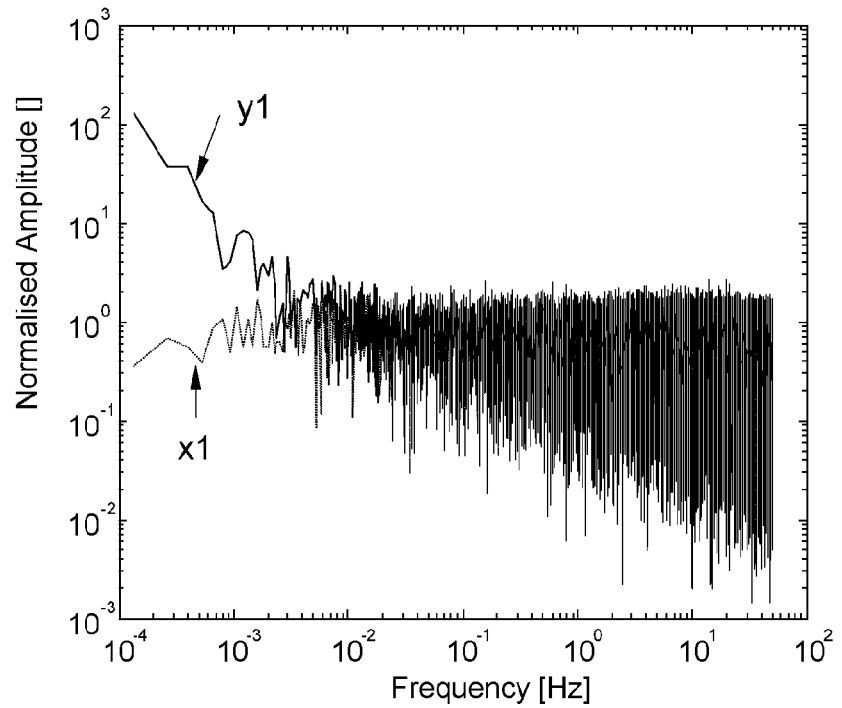
FIG. 20 shows a measurement results obtained with an eleventh experiment.

Results of experiment 11 are shown in FIG. 20. In this experiment the value for the scale factor of Q is increased to 1E-10, resulting in a larger bandwidth. The corresponding effective integration time is here Tint=14 sec, which is less than two times the particular integration time. In this case the bandwidth is sufficiently high. Even at low frequencies, the noise floor level is comparable to that of white noise.

Experiment 12

Figure 21:
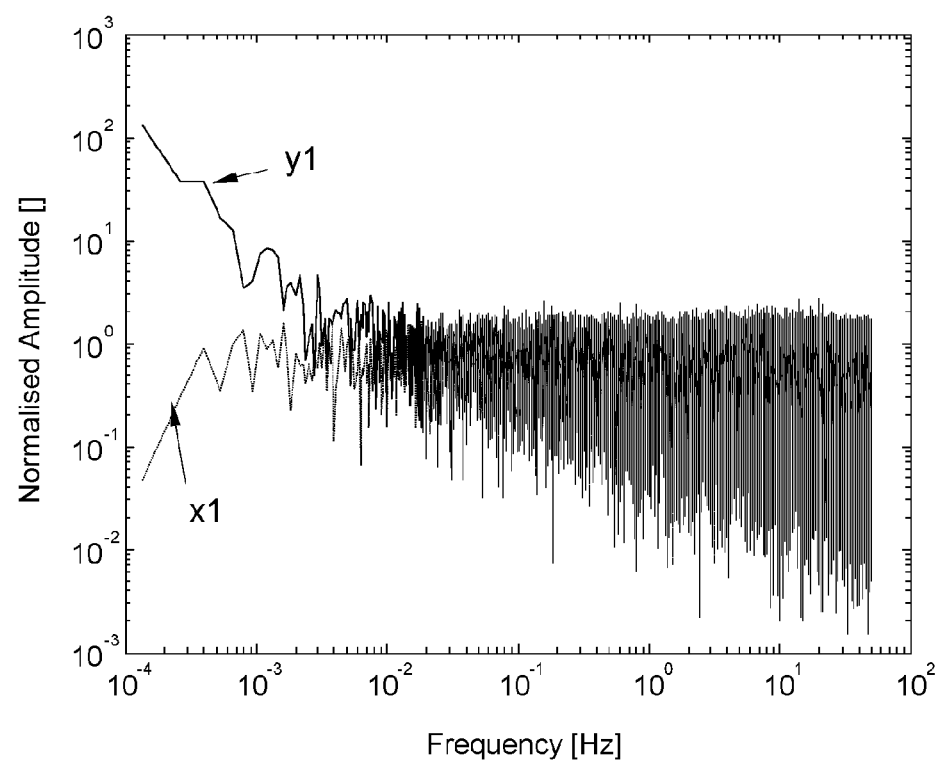
FIG. 21 shows a measurement results obtained with a twelfth experiment.

In experiment 12 the bandwidth of the scale factor of Q is further increased to 1E-8, which results in an effective integration time of 1.4 sec, which is less than two times the second particular integration time, and in particular is less than the particular integration time. Mainly at higher frequencies a further improvement is observed in the frequency plot shown in FIG. 21.

Experiment 13

Figure 22:
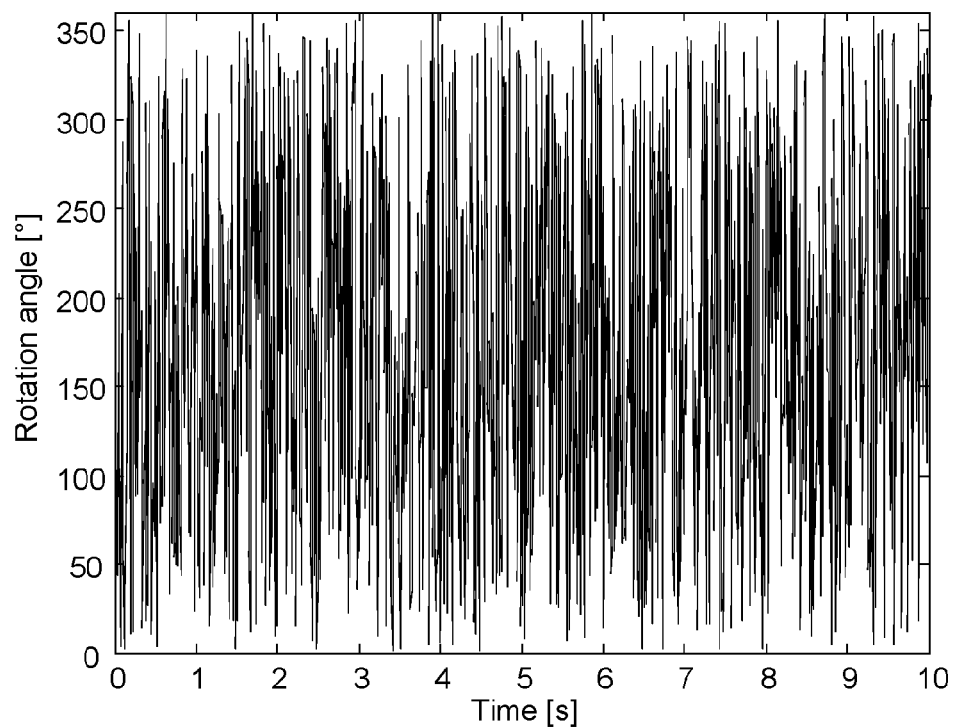
FIG. 22 illustrates a condition used in a thirteenth experiment.
Figure 23:
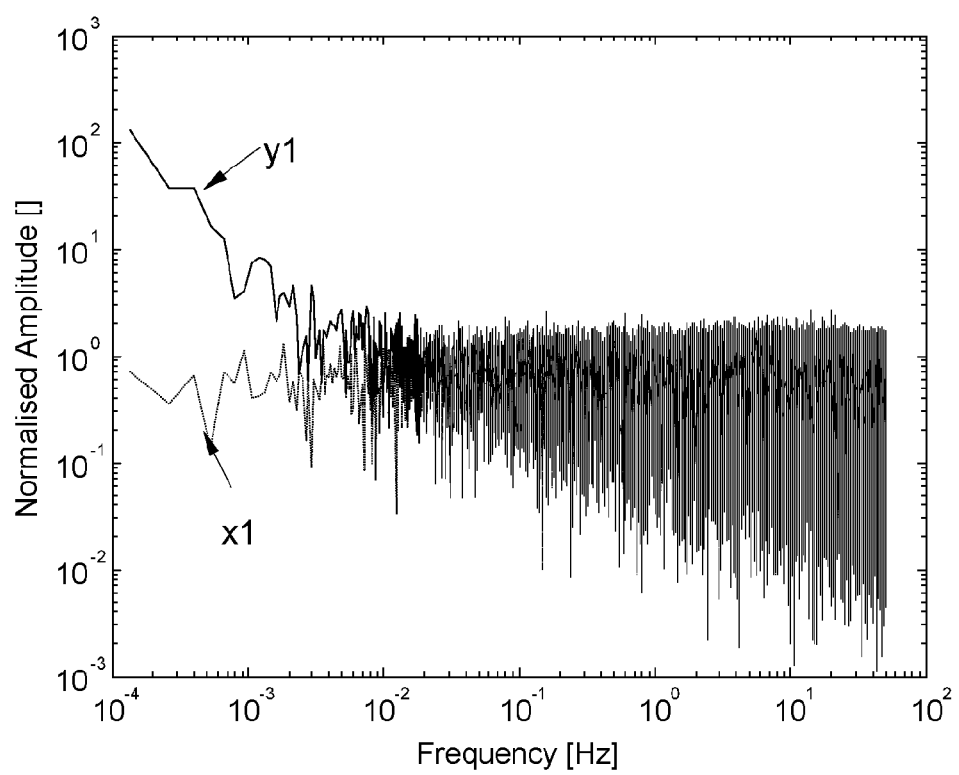
FIG. 23 shows a measurement results obtained with the thirteenth experiment.

In experiment 13 the continuously angular displacement is replaced by a random angular displacement as illustrated in FIG. 22. Other settings correspond to those of experiment 11. Measurement results are shown in FIG. 23. The result is almost the same as obtained with the previous experiments, using uniform angular displacements.

Experiment 14

Figure 24:
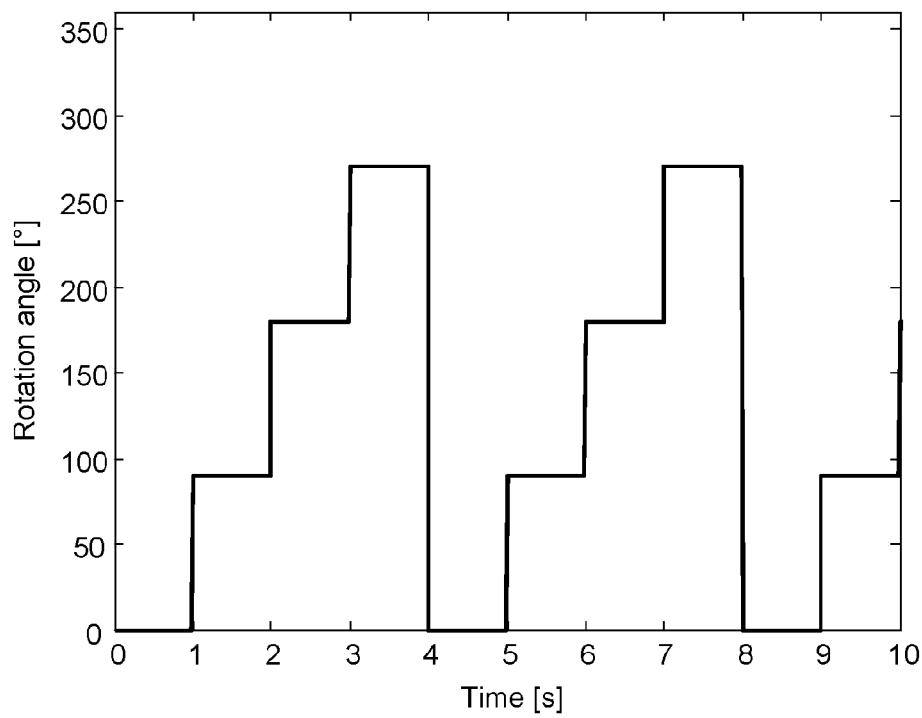
FIG. 24 illustrates a condition used in a fourteenth experiment.
Figure 25:
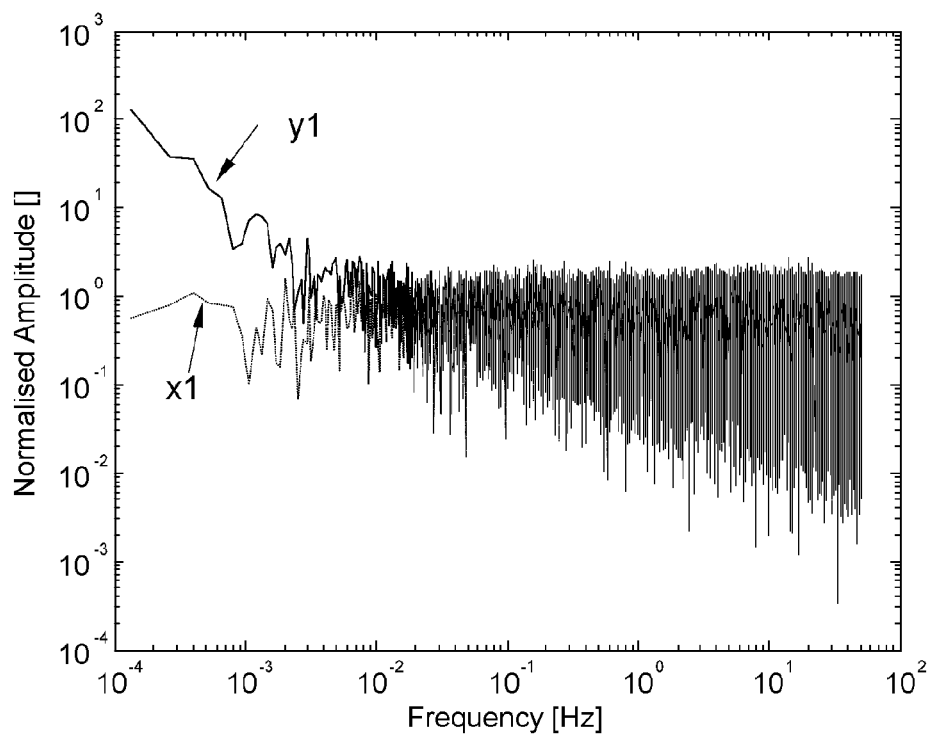
FIG. 25 shows a measurement results obtained with the fourteenth experiment.

In experiment 14 the continuously angular displacement is replaced by a stepwise angular displacement in steps of 90 degr. as illustrated in FIG. 24. The results obtained, shown in FIG. 25, are similar as those in experiment 12, with a continuous rotation, but with otherwise the same circumstances.

Experiment 15

Figure 26:
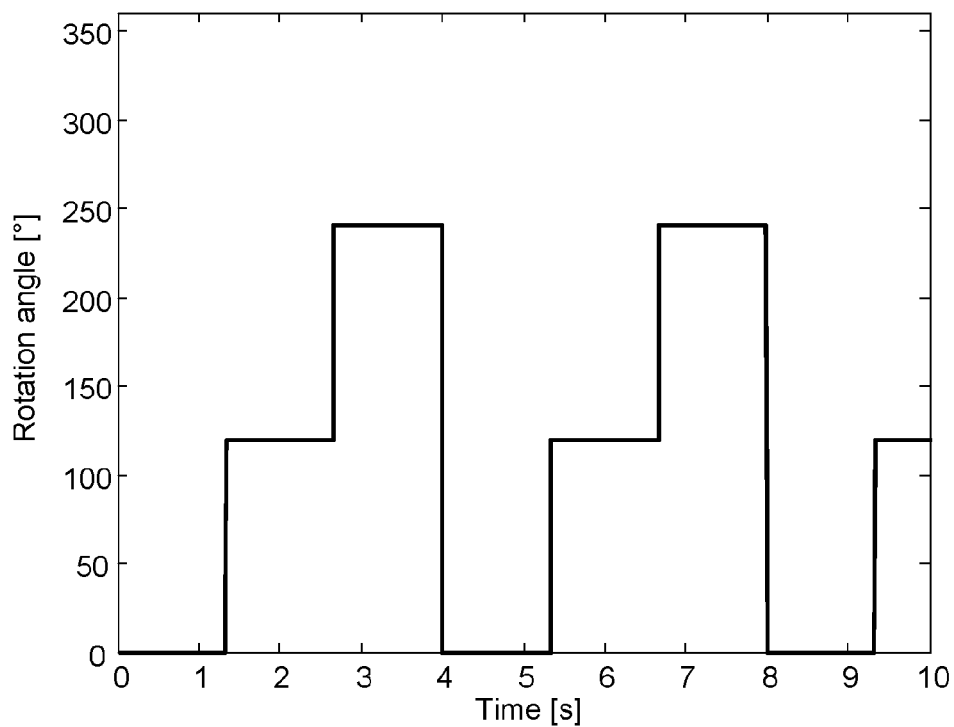
FIG. 26 illustrates a condition used in a fifteenth experiment.
Figure 27:
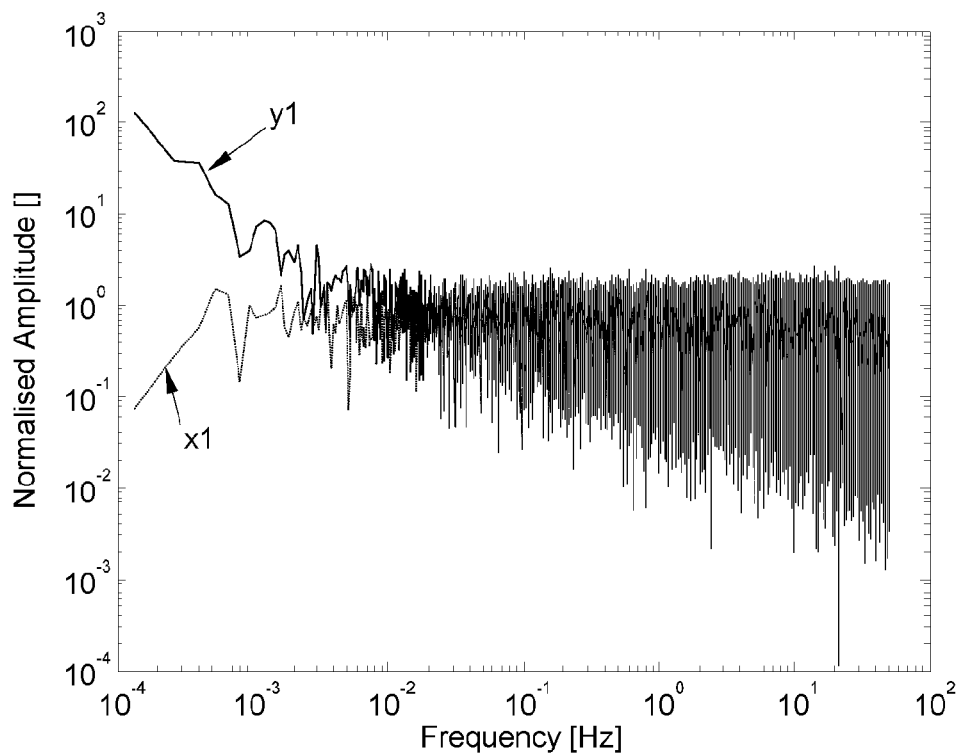
FIG. 27 shows a measurement results obtained with the fifteenth experiment.

In experiment 15 the continuously angular displacement is replaced by a stepwise angular displacement in steps of 120 degr. as illustrated in FIG. 26. The results obtained, shown in FIG. 27, are slightly worse as compared to those obtained with the conditions in experiment 12, with a continuous rotation, but with otherwise the same circumstances. Nevertheless, still a clear noise reduction is obtained in the signal x1.

Experiment 16

Figure 28:
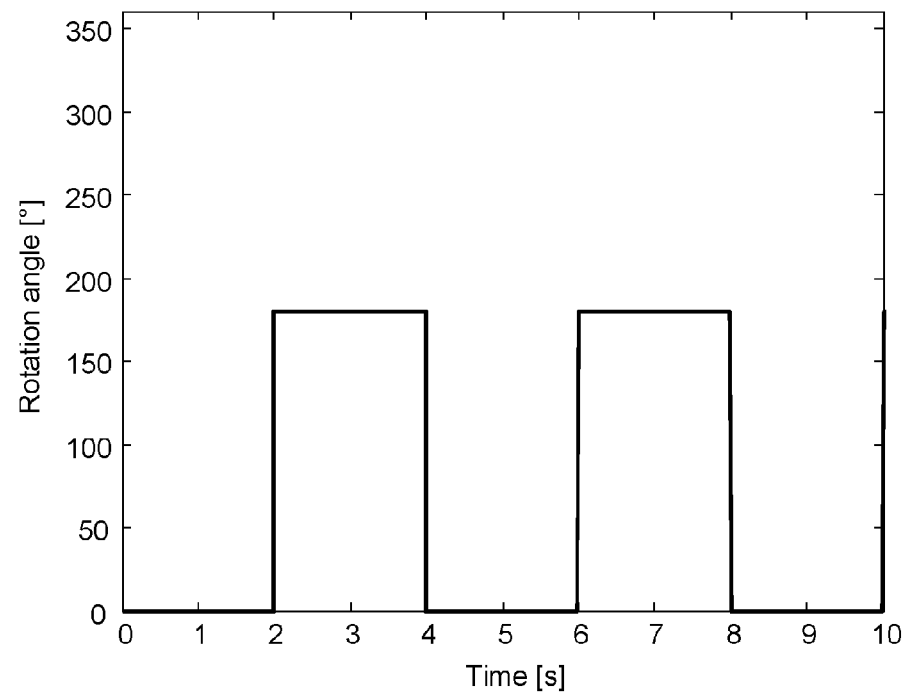
FIG. 28 illustrates a condition used in a sixteenth experiment.
Figure 29:
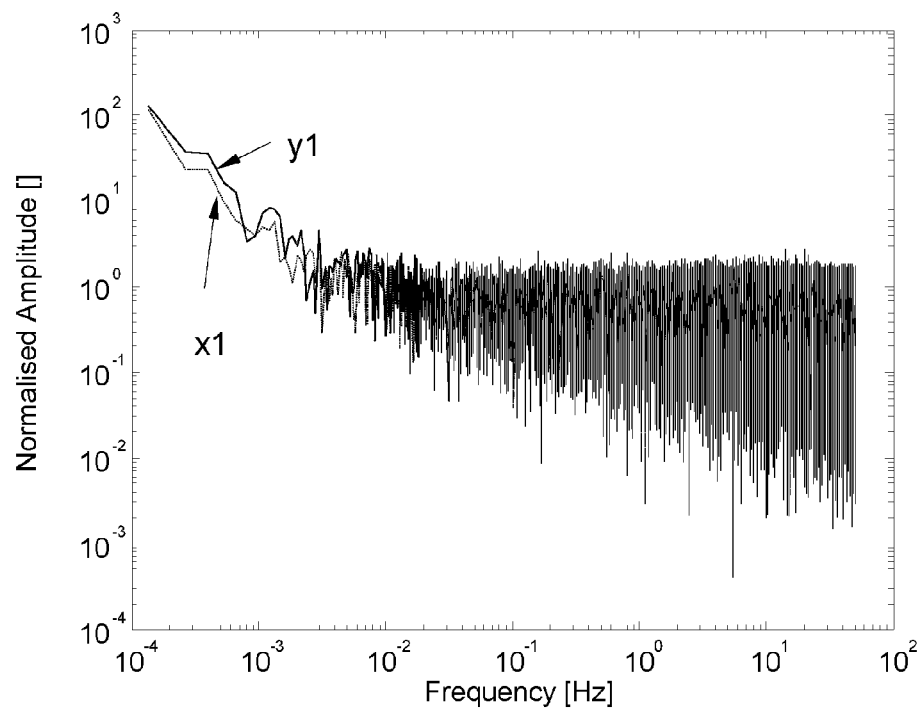
FIG. 29 shows a measurement results obtained with the sixteenth experiment.

In experiment 16 the continuously angular displacement is replaced by a stepwise angular displacement in steps of 180 degr. as illustrated in FIG. 28. The results obtained, shown in FIG. 29. In this case no clear noise reduction is obtained in the signal x1.

Experiment 17

Figure 30:
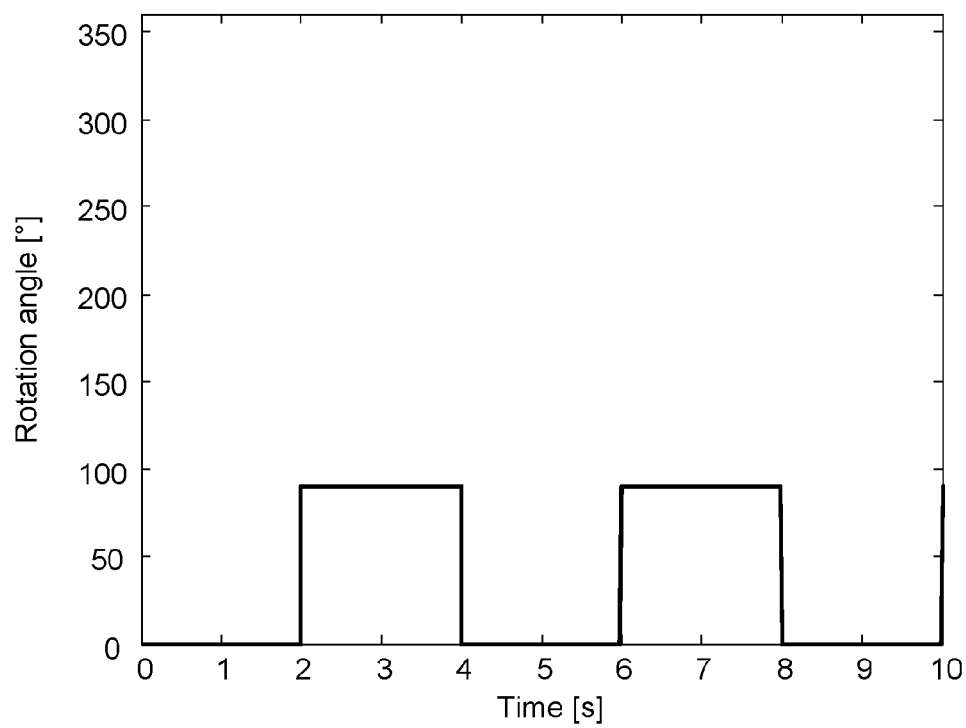
FIG. 30 illustrates a condition used in a seventeenth experiment.
Figure 31:
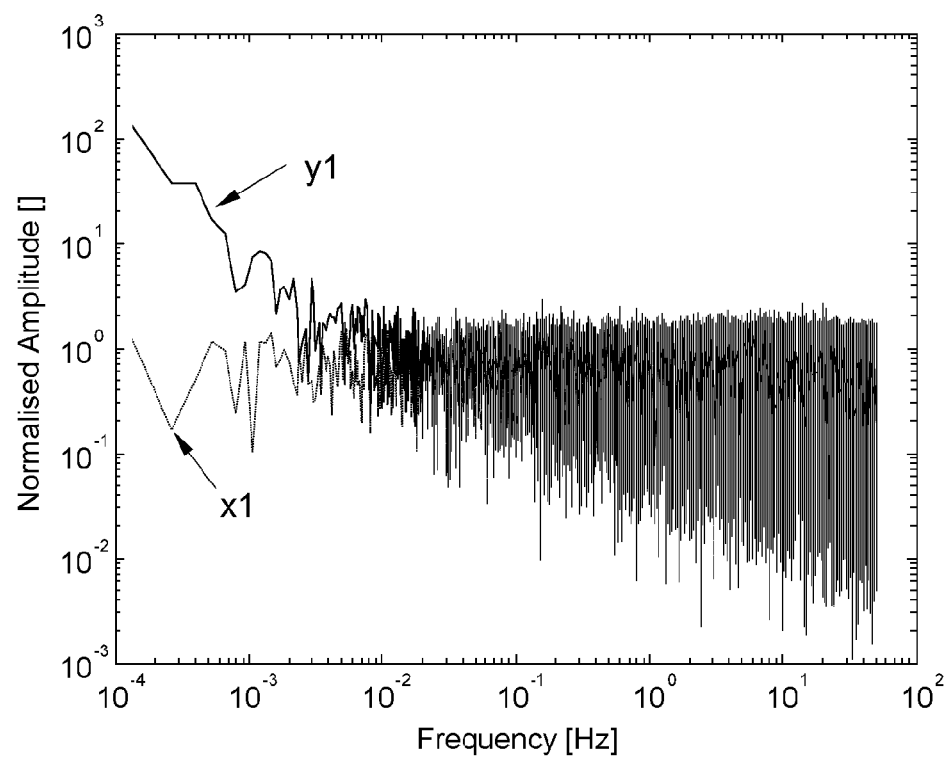
FIG. 31 shows a measurement results obtained with the seventeenth experiment.

In experiment 17 the continuously angular displacement is replaced by a stepwise angular displacement, with steps of 90 degr. and −90 degr. alternating each other. as illustrated in FIG. 30. As illustrated in FIG. 31 a clear noise reduction is obtained in the signal x1.

From the experiments 9 to 17 the following is concluded.

The residual inputted to the Kalman Filter contains wideband white noise and low frequent correlated noise. The correlated noise is to be estimated by the Kalman Filter. It can be proven that a Kalman Filter is the most optimal estimator in the presence of only white noise. For this reason, the use of a Kalman Filter is preferred above other estimation techniques. If the residual contains other not-white noise signals in the frequency band near or above the revolution frequency of the sensor, a Kalman filter may not be the preferred estimator.

The bandwidth of the Kalman filter can be set using the system covariance matrix Q. The bandwidth must be sufficiently high with respect to the bandwidth of the LF noise signal.

It is not essential to have a uniform linear increasing angular displacement. Using only a limited number (N>=2) of discrete angular displacements suffices. The estimation performance is expected to decrease slightly though.

Figure 32A:
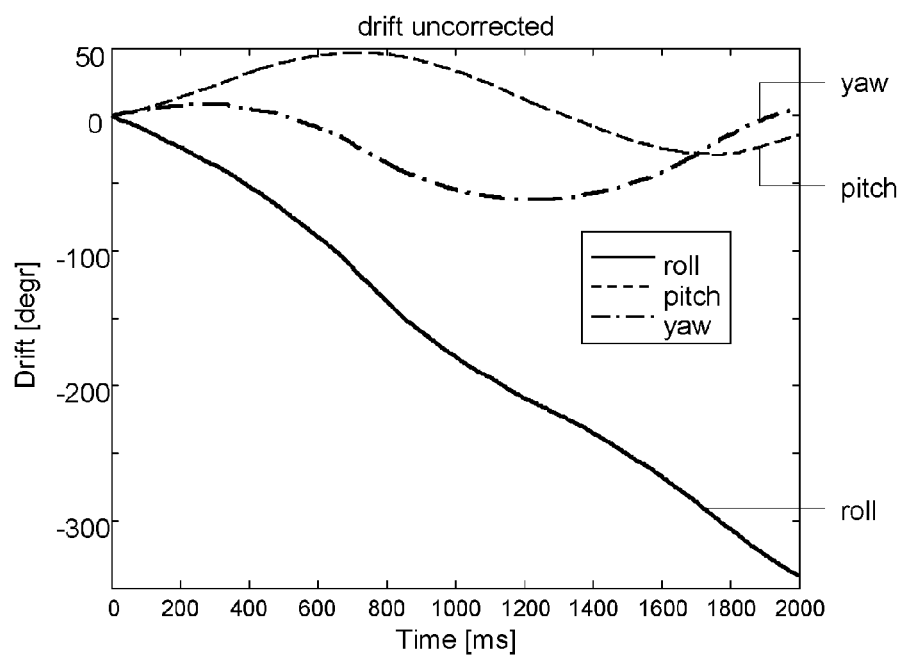
FIG. 32A, 32B shows measurement results with a practical implementation of a measuring device using gyroscopes. Therein
Figure 32B:
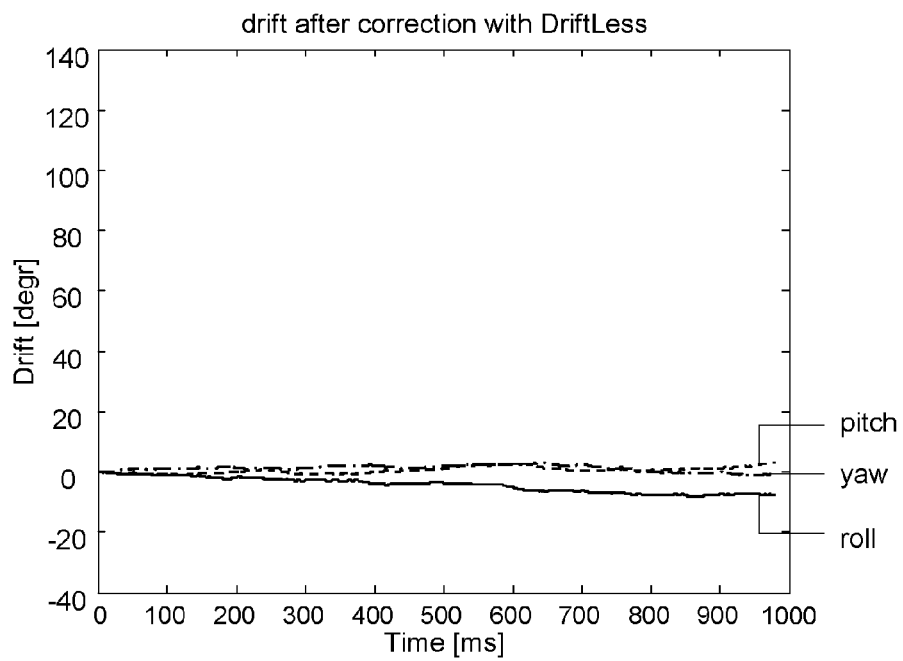

A measuring device according to the first aspect of the invention as illustrated in FIG. 1 was constructed. In this constructed measuring device each of the sensors S1, S2 is a 3D set of mutually orthogonally arranged gyroscopes, further abbreviated as 3D-gyroscope-set. In the constructed measuring device the first 3D-gyroscope-set S1 is rotated according to a first axis by motor M1, and the second 3D-gyroscope-set S2 is rotated around a second axis, perpendicular to the first axis, by motor M2. The low-pass filter LF is implemented by a Kalman filter, which estimates the biases of the gyroscopes. FIG. 32A shows the drift for each of three mutually orthogonal directions yaw, pitch and roll determined on the basis of the output signal y1 of the first 3D-gyroscope-set S1 for a time interval of about 30 min. FIG. 32B shows the drift for each of these three mutually orthogonal directions yaw, pitch and roll determined during the same time interval on the basis of the corrected output signals x1 obtained with the arrangement of FIG. 1 comprising the two 3D-gyroscope-sets S1, S2. From a comparison of FIGS. 32A and B, it is clear that a significant reduction is achieved of the drift in the determined directions. In particular, the drift in roll direction is reduced by a factor 30.

Although the present invention is described mainly with reference to measurement of a two-dimensional quantity, the method is equally applicable to measuring a three-dimensional quantity. In this case the first sensor S1 may include a first sensor having a set of three mutually orthogonally arranged sensor elements and a second sensor with a sensor element that is rotated in a spatial angle. It is not necessary that the second sensor is rotated over the full spatial angle domain. It is sufficient if the second sensor S2 rotates over discrete angles so that the combination of measurement results of the sensor elements of the first sensor S1 and of the sensor element of the second sensor S2 results in a sufficient number of independent equations, from which the correlated low-frequency noise component in the sensing signals can be estimated. The second sensor may for example rotate between orientations $(\alpha,\beta)$ selected from (0,0); (0,90); (90, 0) and (90,90), wherein $\alpha$ is the angle with a first reference axis within the reference system of the measuring device and $\beta$ is the angle with a second reference axis within the reference system of the measuring device, orthogonal to the first reference axis.

It will be understood by the skilled person that embodiment of the measurement device can be made applicable to measurement of other vector physical quantities, provided that sensors S1, S2 are applied capable of rendering a sensing signal for said vectorial physical quantities. Particular examples of such other vectorial physical quantities are an electric field-strength and a magnetic field strength.

In the claims the word "comprising" does not exclude other elements or steps, and the indefinite article "a" or "an" does not exclude a plurality. A single component or other unit may fulfill the functions of several items recited in the claims. The mere fact that certain measures are recited in mutually different claims does not indicate that a combination of these measures cannot be used to advantage. Any reference signs in the claims should not be construed as limiting the scope. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The invention claimed is:

1. A measuring device for measuring a vectorial physical quantity (x), comprising
at least a first and a second sensor (S1, S2) each arranged for measuring a component of the vectorial physical quantity (x), and for generating a respective sense signal (y1, y2), said sense signals each including a first part indicative for the component of the measured quantity (x) and a second, noise part, said sensors having an Allan variance curve with a minimum value for a particular integration time Tmin, said Allan variance curve having a first tangent line to a portion of the curve for which the integration time approaches 0, and having a second, horizontal, tangent line of constant standard deviation corresponding to said Allan minimum value, said first and said second tangent line having an intersection point for a second particular integration time,
characterized by
an actuator (M2) for causing a relative rotation between said at least a first and a second sensor,
a noise extraction unit (NX) for receiving the sense signals (y1, y2) and for providing a difference signal (r) indicative for a weighted difference between the sense signals (y1, y2), said weighted difference being substantially independent of the vectorial physical quantity (x), said noise extraction unit (NX) comprising, a signal weighting unit (SW) for weighting the sense signals (y1, y2) dependent on the relative rotation, and for providing mutually weighted sense signals (y1r, y2), the signal weighting unit having at least one multiplication unit for multiplying one of the sense signals with a weighting factor, a signal compensation unit (SC), for receiving the mutually weighted sense signals (y1r, y2) from the signal weighting unit, and for providing a difference signal (r) indicative for a difference between the mutually weighted sense signals, a low frequency noise estimator (LF) for estimating a low frequency noise component from the difference signal (r) and from information about the relative rotation ($\alpha$) between the sensors and for generating an estimated noise signal (n1) indicative for the value of said noise component, said low frequency noise estimator having an effective integration time, which is at least two times a sample time with which the sense signals are obtained, which effective integration time is less than the smallest particular integration time of the sensors comprised in the measuring device and which effective integration time is at most two times said second integration time, a correction unit (NC) for receiving the estimated noise signal and the output signal (y1) of one of the sensors and for providing an output signal (x1) indicative for a sensed value of the vectorial physical quantity corrected for the noise as estimated by said low frequency noise estimator.

2. The measuring device according to claim 1, wherein the effective integration time is less than or equal to said second integration time.

3. The measuring device according to claim 1, comprising a respective actuator (M1, M2) and a respective signal rotation unit (R1, R2) for each of the sensors (S1, S2), wherein the signal weighting unit (R1) for the first sensor (S1) mathematically inverts the rotation caused to the first component of the first signal by the rotation of the actuator (R1) for said first sensor, and wherein the signal weighting unit (R2) for the second sensor (S2) mathematically inverts the rotation caused to the first component of the second sense signal by the rotation of the actuator (R2) for said second sensor.

4. The measuring device according to claim 1, having a reference frame, wherein the first sensor (S1) is fixed with respect to said reference frame, and provided with an actuator (M2) for rotating the second sensor (S2) with respect to the reference frame, and with a signal weighting unit (R2) for mathematically inverting the rotation caused to the first component of the second signal by the rotation of the actuator (R2) for said second sensor.

5. The measuring device according to claim 1, wherein the low-frequency noise estimator is a least squares estimator, wherein the effective integration time is the duration of a time-frame wherein a sequence of samples is obtained used for estimating the low frequency noise component.

6. The measuring device according to claim 1, wherein the low-frequency noise estimator is a Kalman filter with a turn-over frequency Fc, the effective integration time being 1/Fc.

7. The measuring device according to claim 1, wherein the low-frequency noise estimator is a Kalman filter with system covariance matrix being a unity matrix with scale factor $k_Q$, and a noise covariance matrix being a unity matrix with scale factor $k_R$, the effective integration time being the product of the sample time Ts and the square root of the ratio defined by the noise covariance matrix $k_R$ divided by the system covariance scale factor $k_Q$.

8. The measuring device according to claim 1, wherein the actuator (M2) is arranged for causing a continuous relative rotation between said at least a first and a second sensor.

9. The measuring device according to claim 1, wherein the actuator (M2) is arranged for causing a stepwise relative rotation between a plurality of mutually different angular positions.

10. The measuring device according to claim 9, the plurality of mutually different angular positions differ from each other by an angle in the range from 40 to 140 degrees.

11. The measuring device according to claim 10, wherein the plurality of angular positions is two, and these angular positions differ by 90 degrees.

12. A measuring method for measuring a vectorial physical quantity (x), comprising measuring a component of the vectorial physical quantity (x) with at least a first and a second sensor (S1, S2) therewith generating a respective sense signal (y1, y2,) respectively, said sense signals each including a first part indicative for the component of the measured quantity (x) and a second, noise part, said sensors having an Allan variance curve with a minimum value for a particular integration time Tmin, said Allan variance curve having a first tangent line to a portion of the curve for which the integration time approaches 0, and having a second, horizontal, tangent line of constant standard deviation corresponding to said Allan minimum value, said first and said second tangent line having an intersection point for a second particular integration time, characterized by causing a relative rotation between said at least a first and a second sensor, providing a difference signal (r) indicative for a weighted difference between the sense signals (y1, y2), said weighted difference being substantially independent of the vectorial physical quantity (x), comprising the steps of weighting the sense signals (y1, y2) dependent on the relative rotation to provide mutually weighted sense signals (y1r, y2), the signal weighting unit having at least one multiplication unit for multiplying one of the sense signals with a weighting factor, providing a difference signal (r) indicative for a difference between the mutually weighted sense signals (y1r, y2), estimating a correlated low frequency noise component from the difference signal (r) and from information about the relative rotation (a) between the sensors and for generating an estimated noise signal (n) indicative for the estimated value of said noise component, said low frequency noise estimation having an associated effective integration time that is at least two times a sample time with which the sense signals are obtained, which effective integration time is less than the smallest particular integration time of the sensors comprised in the measuring device and which effective integration time is at most two times said second integration time, providing an output signal (x1) indicative for a sensed value (y1) of the vectorial physical quantity corrected for the noise (n) as estimated by said low frequency noise estimation.

\* \* \* \* \*